US012633606B2

(12) United States Patent
Park et al.

(10) Patent No.: US 12,633,606 B2
(45) Date of Patent: May 19, 2026

(54) BATTERY MODULE

(71) Applicant: Samsung SDI Co., Ltd., Yongin-si (KR)

(72) Inventors: Daeyeop Park, Yongin-si (KR); Heonhee Kim, Yongin-si (KR); Junhyung Lee, Yongin-si (KR); Jisoon Lim, Yongin-si (KR); Sunghoon Jung, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 174 days.

(21) Appl. No.: 17/646,646

(22) Filed: Dec. 30, 2021

(65) Prior Publication Data

US 2022/0209347 A1　Jun. 30, 2022

(30) Foreign Application Priority Data

Dec. 31, 2020　(KR) ........................ 10-2020-0189841
Dec. 30, 2021　(KR) ........................ 10-2021-0192905

(51) Int. Cl.
*H01M 50/20*　(2021.01)
*H01M 10/613*　(2014.01)
(Continued)

(52) U.S. Cl.
CPC ....... *H01M 50/204* (2021.01); *H01M 10/613* (2015.04); *H01M 10/625* (2015.04);
(Continued)

(58) Field of Classification Search
CPC ........... H01M 10/625; H01M 10/6556; H01M 50/147–15; H01M 50/204–262;
(Continued)

(56) References Cited

U.S. PATENT DOCUMENTS

2008/0160395 A1　7/2008　Okada et al.
2012/0312614 A1*　12/2012　Fujiwara ............. H01M 50/209
180/68.5
(Continued)

FOREIGN PATENT DOCUMENTS

CN　　101212032 A　　7/2008
CN　　102820439 A　　12/2012
(Continued)

OTHER PUBLICATIONS

JP-2009301877-A—Mitsui—English translation accessed Jan. 29, 2025 (Year: 2025).*
(Continued)

*Primary Examiner* — Mayla Gonzalez Ramos
*Assistant Examiner* — Bethany C Garcia
(74) *Attorney, Agent, or Firm* — Womble Bond Dickinson (US) LLP

(57) ABSTRACT

A battery module includes: a battery assembly; a main housing comprising a main edge part surrounding an accommodation space in which the battery assembly is located; a first plate comprising a first edge part coupled to the main edge part and a first exposure part exposed from the main edge part and defining one side of a cooling path for cooling the accommodation space; and a second plate facing the first plate and defining an other side of the cooling path, wherein a matching structure with the main edge part is formed at the first edge part.

16 Claims, 13 Drawing Sheets

(51) Int. Cl.

| | |
|---|---|
| *H01M 10/625* | (2014.01) |
| *H01M 10/6556* | (2014.01) |
| *H01M 50/204* | (2021.01) |
| *H01M 50/249* | (2021.01) |

(52) U.S. Cl.
CPC ..... *H01M 10/6556* (2015.04); *H01M 50/249* (2021.01); *H01M 2220/20* (2013.01)

(58) Field of Classification Search
CPC ......... H01M 10/6554; H01M 10/6551; H01M 10/6557; H01M 10/6562; H01M 50/249; H01M 50/20; H01M 50/271; H01M 50/258; H01M 50/244; H01M 50/289; H01M 2220/20; H01M 10/60–617; H01M 10/655–6566; H01M 50/202–207; H01M 50/291; H01M 50/293; H01M 10/647; H01M 10/6568; H01M 50/209; H01M 10/6567; H01M 10/6555; H01M 50/211; H01M 50/264; Y02E 60/10; Y02T 10/70; B60K 1/00; B60K 1/04; B60K 2001/0438; B60K 2001/003; B60L 50/64; B60L 58/24; B60L 58/26; B60Y 2306/05; F28F 3/12; Y02P 70/50
See application file for complete search history.

(56) References Cited

U.S. PATENT DOCUMENTS

| | | | |
|---|---|---|---|
| 2013/0095364 A1 | 4/2013 | Yong et al. | |
| 2014/0106211 A1* | 4/2014 | Lee ..................... | H01M 50/262 |
| | | | 429/185 |
| 2014/0220423 A1 | 8/2014 | Yi et al. | |
| 2015/0037661 A1 | 2/2015 | Lee et al. | |
| 2016/0222631 A1* | 8/2016 | Kohno ................ | H01M 10/647 |
| 2017/0033419 A1 | 2/2017 | Eom et al. | |
| 2018/0154754 A1 | 6/2018 | Rowley et al. | |
| 2019/0074494 A1 | 3/2019 | Krenzer et al. | |
| 2019/0115614 A1* | 4/2019 | Sakurai ............ | H01M 10/0486 |
| 2021/0126313 A1 | 4/2021 | Lee et al. | |
| 2021/0351455 A1 | 11/2021 | Kim et al. | |

FOREIGN PATENT DOCUMENTS

| | | | | |
|---|---|---|---|---|
| CN | 103117363 A | 5/2013 | | |
| CN | 109449329 A | 3/2019 | | |
| CN | 208904181 U | 5/2019 | | |
| DE | 10 2016 213 832 A1 | 2/2018 | | |
| JP | 2009301877 A | * 12/2009 | ............ | Y02E 60/10 |
| KR | 10-2014-0008123 A | 1/2014 | | |
| KR | 10-2014-0100085 A | 8/2014 | | |
| KR | 2015-0118375 A | 10/2015 | | |
| KR | 10-2019-0063109 A | 6/2019 | | |
| KR | 10-2073191 B1 | 2/2020 | | |
| KR | 10-2020-0033778 A | 3/2020 | | |
| WO | WO 2016-131141 A1 | 8/2016 | | |

OTHER PUBLICATIONS

EPO Extended European Search Report dated May 27, 2022, issued in corresponding European Patent Application No. 21218478.2 (8 pages).
European Office Action dated Dec. 9, 2024, issued in European Patent Application No. 21218478.2, 4 pages.
Chinese Office Action dated Jan. 21, 2025, issued in Chinese Patent Application No. 202111659955.4, 11 pages.
Korean Office Action for KR Application No. 10-2021-0192905, dated Apr. 6, 2026, 6 pages.

* cited by examiner

FIG. 6

BATTERY MODULE

CROSS-REFERENCE TO RELATED APPLICATION

The present application claims priority to and the benefit of Korean Patent Application No. 10-2020-0189841, filed on Dec. 31, 2020, and Korean Patent Application No. 10-2021-0192905, filed Dec. 30, 2021 in the Korean Intellectual Property Office, the entire contents of both of which are incorporated herein by reference.

BACKGROUND

1. Field

Aspects of one or more embodiments relate to battery modules.

2. Description of the Related Art

Secondary batteries are generally capable of being charged and discharged repeatedly, as opposed to primary batteries that are generally not recharged. Secondary batteries may be used as an energy source for various electronic devices that benefit from a re-chargeable power source such as, mobile devices, electric vehicles, hybrid vehicles, electric bicycles, uninterruptible power suppliers, and the like, and secondary batteries may be in the form of a single cell or in the form of a pack in which multiple cells are connected into one unit, depending on the type of an external device to be applied.

Although small mobile devices such as mobile phones can operate for a certain period of time with the output and capacity of a single cell, when a relatively long driving time and/or relatively high-power driving are desired, for example, in large-sized mobile devices such as notebook computers, or electric vehicles or hybrid vehicles that consume a relatively large amount of power, a pack-type battery containing multiple cells may be utilized due to provide relatively improved output and capacity, and the output voltage or output current may be increased depending on the number of built-in cells.

The above information disclosed in this Background section is only for enhancement of understanding of the background and therefore the information discussed in this Background section does not necessarily constitute prior art.

SUMMARY

Aspects of one or more embodiments include battery modules having a module housing which may provide relatively high cooling performance and may have a relatively light weight due to the use of composite materials including different heterogeneous materials. Some embodiments may additionally have a relatively improved coupling strength between the heterogeneous materials to prevent or reduce instances of leakage of a cooling path.

Additional aspects will be set forth in part in the description which follows and, in part, will be apparent from the description, or may be learned by practice of the presented embodiments of the disclosure.

According to one or more embodiments, a battery module includes at least one battery assembly, a main housing including a main edge part surrounding an accommodation space for accommodating the battery assembly, a first plate including a first edge part coupled to the main edge part and a first exposure part exposed from the main edge part and defining one side of a cooling path for cooling the accommodation space, and a second plate arranged to face the first plate and defining an other side of the cooling path, wherein a matching structure with the main edge part is formed at the first edge part.

According to some embodiments, the matching structure may include, as a plurality of holes formed along the first edge part, a plurality of holes filled with part of the main edge part and formed in a complementary shape to the plurality of holes.

According to some embodiments, the matching structure may include, as a plurality of protruding portions formed along the first edge part, a plurality of protruding portions formed in a complementary shape to the plurality of protruding portions and embedded by part of the main edge part.

According to some embodiments, the matching structure may include a plurality of holes and a plurality of protruding portions formed along the first edge part, and the plurality of protruding portions are formed at inner positions of the first edge part than the plurality of holes formed at an edge of the first edge part.

According to some embodiments, the matching structure may include, as an uneven pattern formed along the first edge part, an uneven pattern forming an inclined interface with the main edge part formed in a complementary shape to the uneven pattern.

According to some embodiments, the uneven pattern may form a pair of interfaces inclined to face each other.

According to some embodiments, the pair of interfaces may have inclinations that approach each other from a lower position to an upper position in a direction opposite to the second plate.

According to some embodiments, the uneven pattern may include a first pair of interfaces inclined to face each other and a second pair of interfaces inclined to face each other between the first pair of interfaces.

According to some embodiments, each of the first pair of interfaces and the second pair of interfaces may have inclinations that approach each other from a lower position to an upper position in a direction opposite to the second plate.

According to some embodiments, the second pair of interfaces may have inclinations that are further inclined toward the second plate than the first pair of interfaces.

According to some embodiments, the matching structure may include both of a plurality of holes formed along the first edge part and an uneven pattern, and the uneven pattern is formed at an inner position of the first edge part than the plurality of holes formed at an edge of the first edge part.

According to some embodiments, the main edge part and the first edge part may be coupled to each other by a first coupling line formed along the first edge part.

According to some embodiments, the first coupling line may include a recessed holding portion that is formed concave to surround the first edge part.

According to some embodiments, the recessed holding portion may continuously surround an upper surface, a lower surface, and a side surface connecting the upper surface and the lower surface of the first edge part.

According to some embodiments, an upper surface of the first plate may include the upper surface of the first edge part and an upper surface of the first exposure part facing the accommodation space, and a lower surface of the first plate may include the lower surface of the first edge part and a lower surface of the first exposure part facing the cooling path.

According to some embodiments, the recessed holding portion may include an upper width covering the upper surface of the first edge part and a lower width covering the lower surface of the first edge part, and at least any one of the upper width or the lower width forms a matching structure with the first plate.

According to some embodiments, the lower width may be greater than the upper width.

According to some embodiments, a filling width may be formed on the first edge part from the first edge part out of the upper width to a boundary with the first exposure part.

According to some embodiments, a filler for reinforcing a coupling between the first edge part and the main edge part may be formed in the filling width.

According to some embodiments, the accommodation space may include a plurality of accommodation spaces for accommodating battery assemblies different from each other, and the main edge part surrounds each of the plurality of accommodation spaces.

According to some embodiments, the first plate may include a plurality of first plates that are individually formed to each of a plurality of accommodation space.

According to some embodiments, the second plate may include one second plate that is commonly formed to a whole of a plurality of accommodation spaces.

According to some embodiments, the second plate may include a second edge part coupled to the main edge part and a second exposure part exposed from the main edge part and defining the other side of the cooling path.

BRIEF DESCRIPTION OF THE DRAWINGS

The above and other aspects, features, and characteristics of certain embodiments of the disclosure will be more apparent from the following description taken in conjunction with the accompanying drawings, in which:

FIG. 6 is a cross-sectional view of a module housing taken along the line VI-VI of FIG. 2;

DETAILED DESCRIPTION

Figure 1:
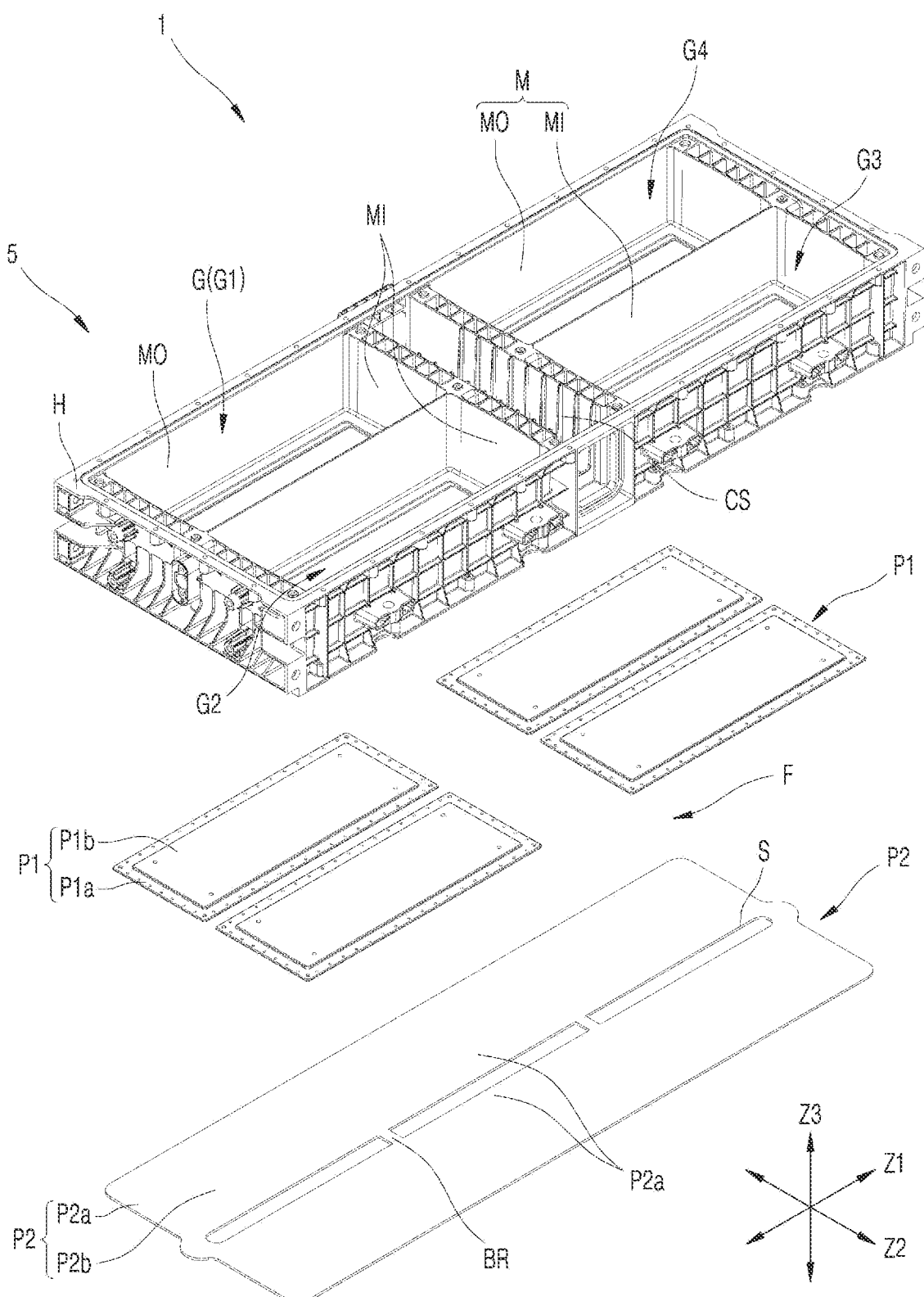
FIG. 1 is an exploded perspective view of a battery module according to some embodiments.

Reference will now be made in more detail to aspects of some embodiments, which are illustrated in the accompanying drawings, wherein like reference numerals refer to like elements throughout. In this regard, the example embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a battery module according to some embodiments is described with reference to the accompanying drawings.

Figure 2:
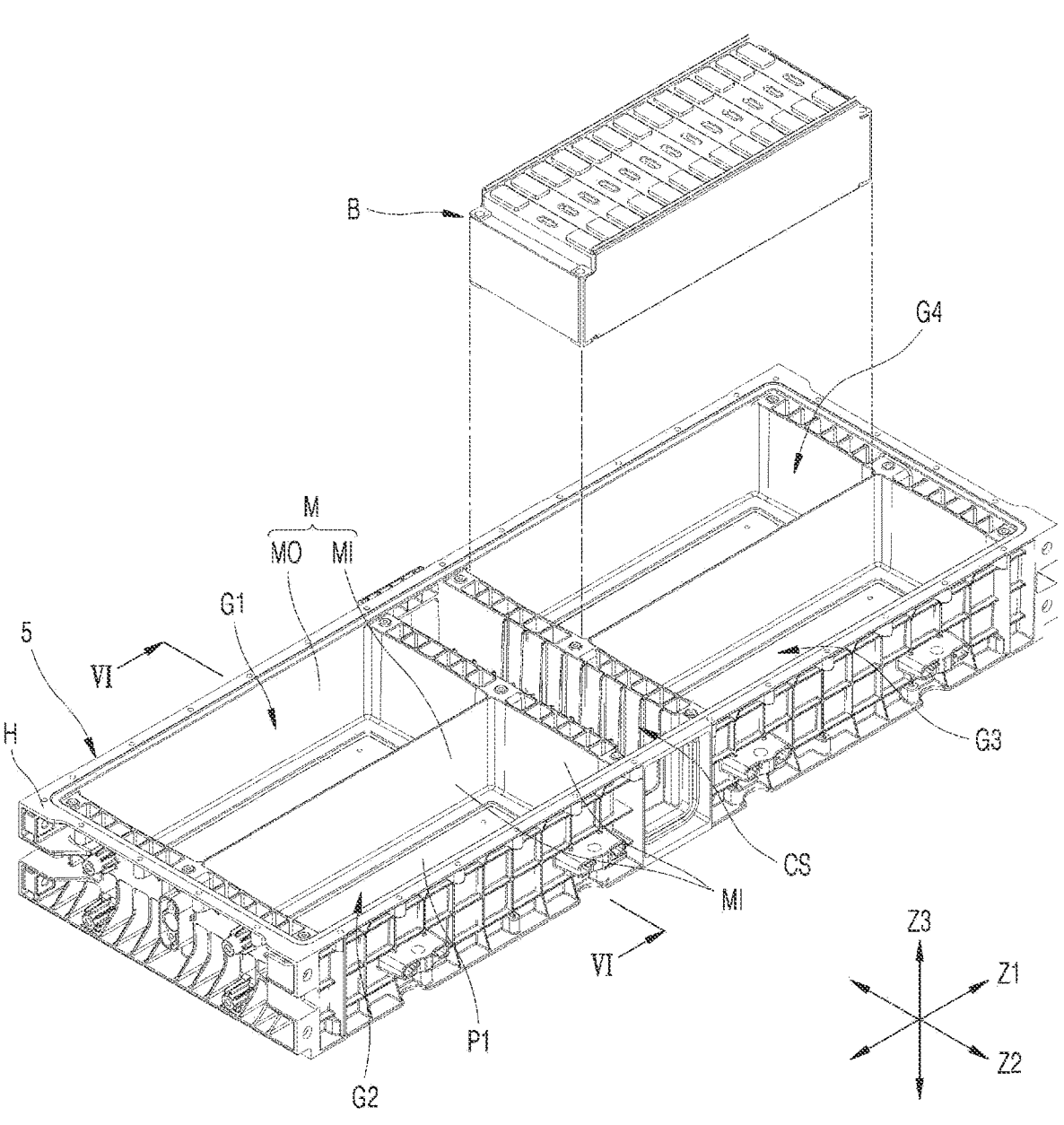
FIG. 2 is a perspective view of a module housing of FIG. 1.
Figure 3:
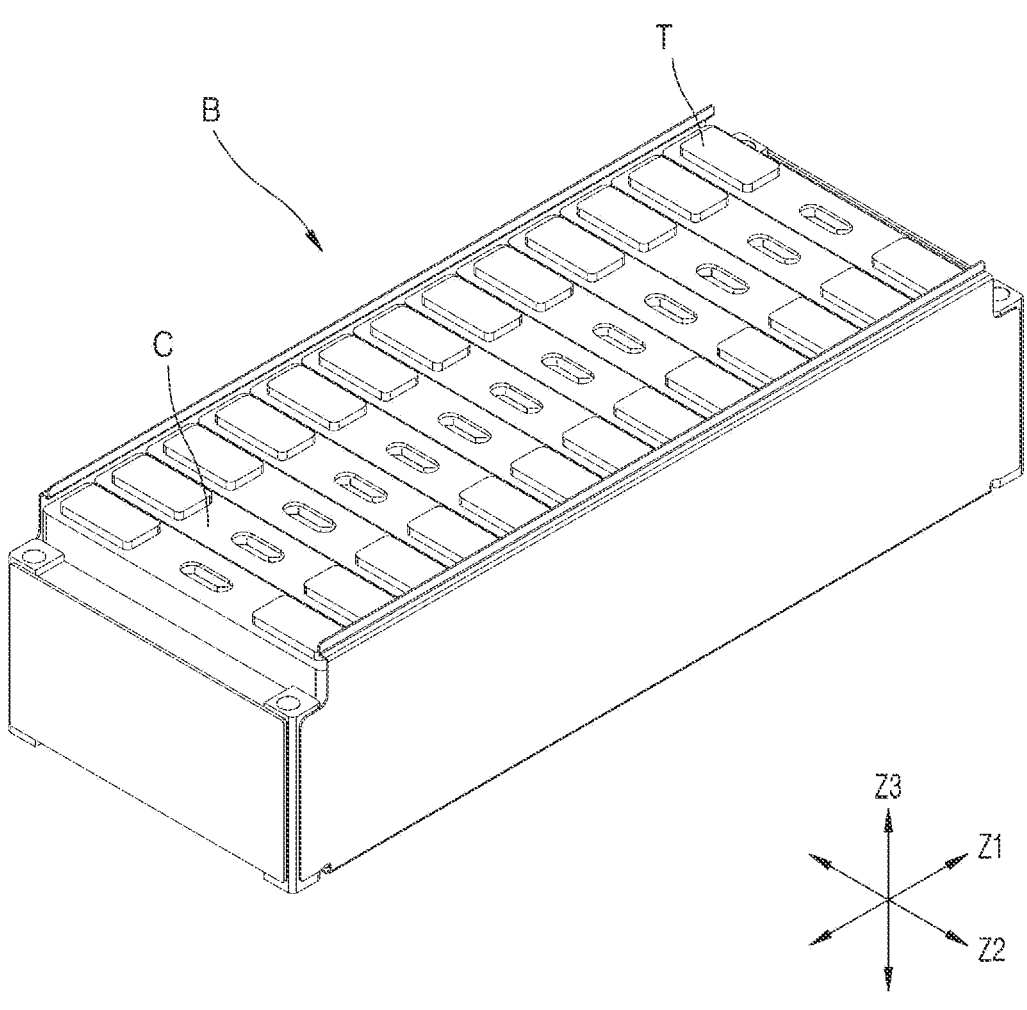
FIG. 3 is a perspective view of a battery assembly of FIG. 1.
Figure 4:
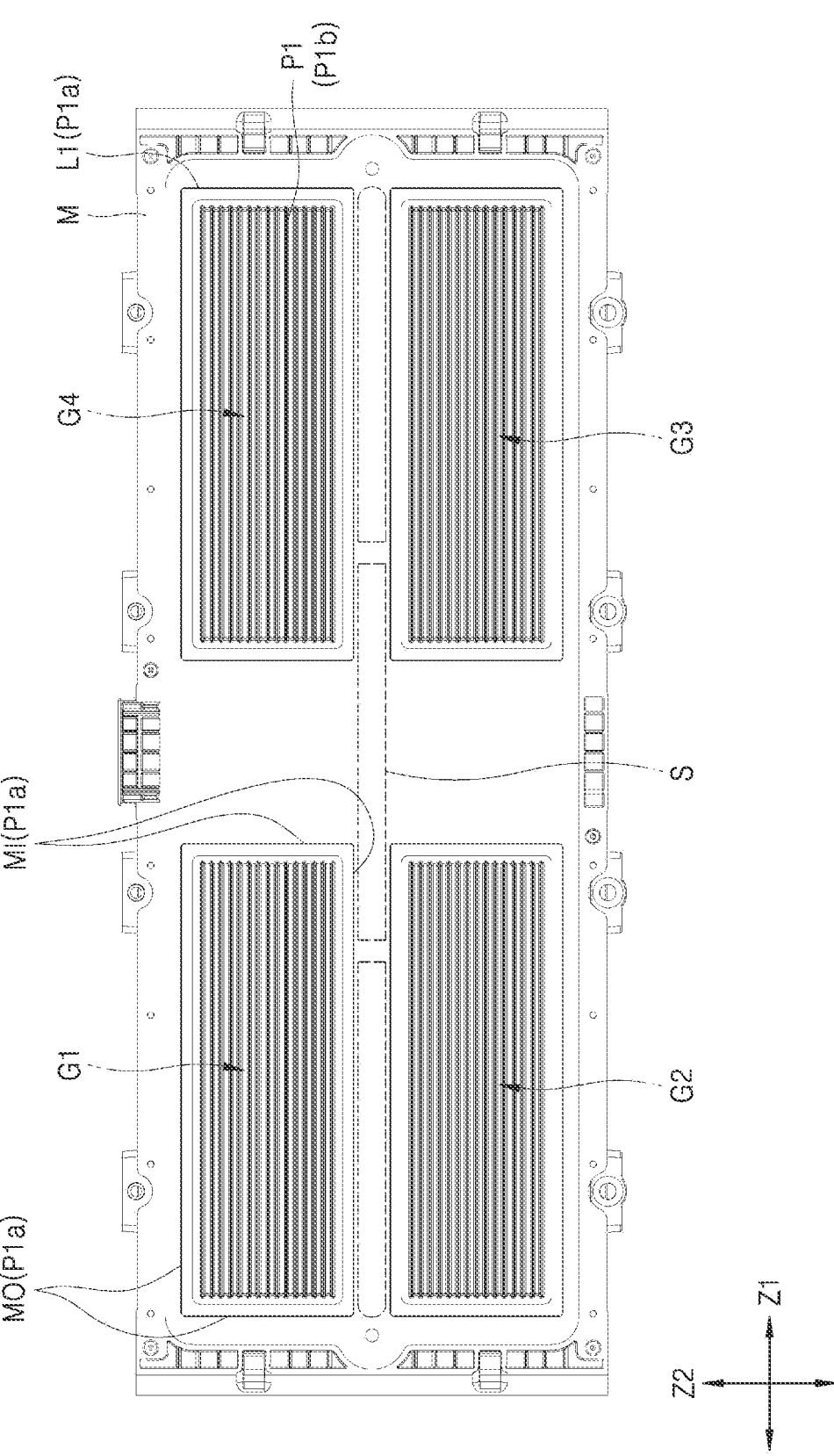
FIG. 4 is a plan view of a first coupling line for coupling a first plate of FIG. 1.
Figure 5:
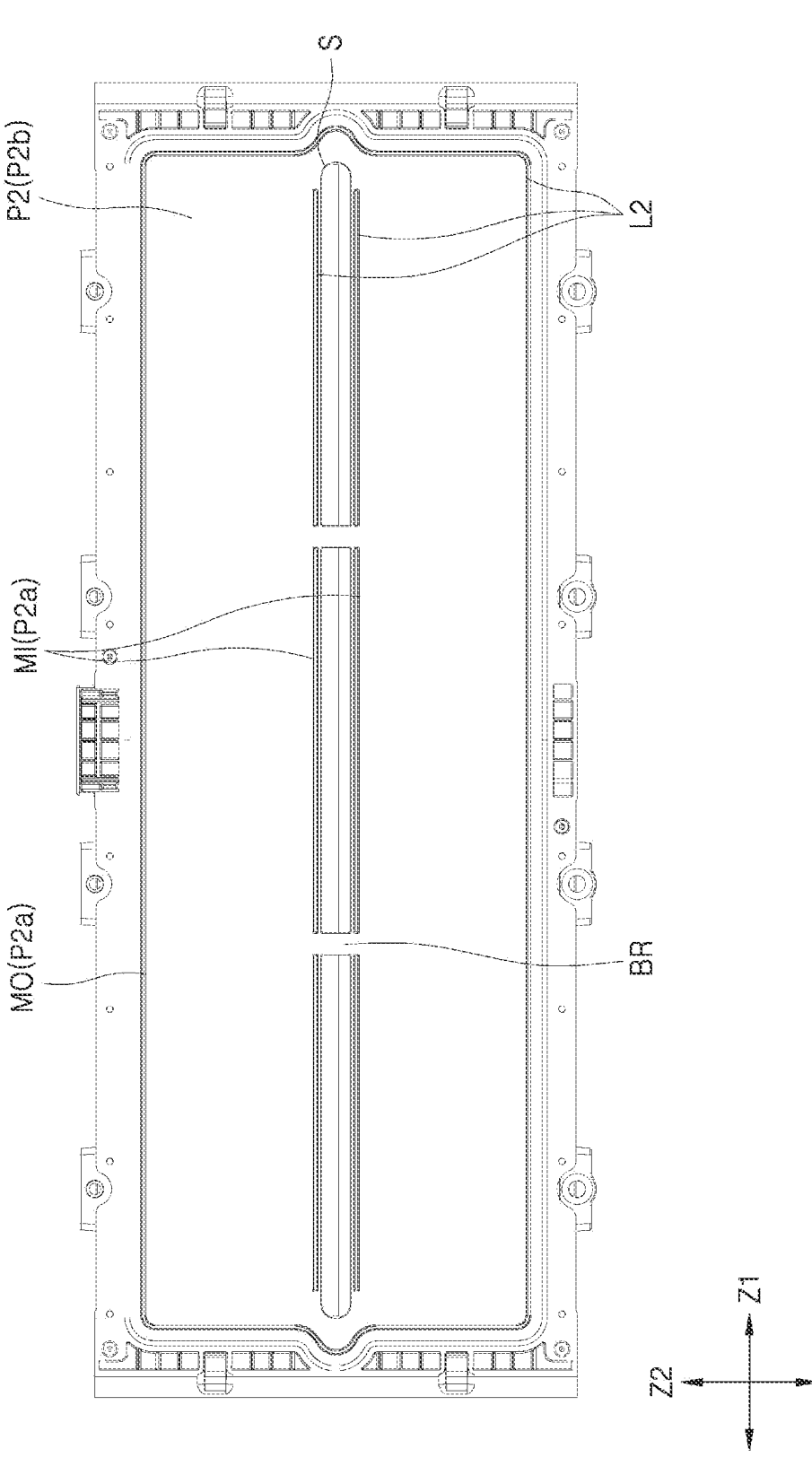
FIG. 5 is a plan view of a second coupling line for coupling a second plate of FIG. 1.
Figure 6:
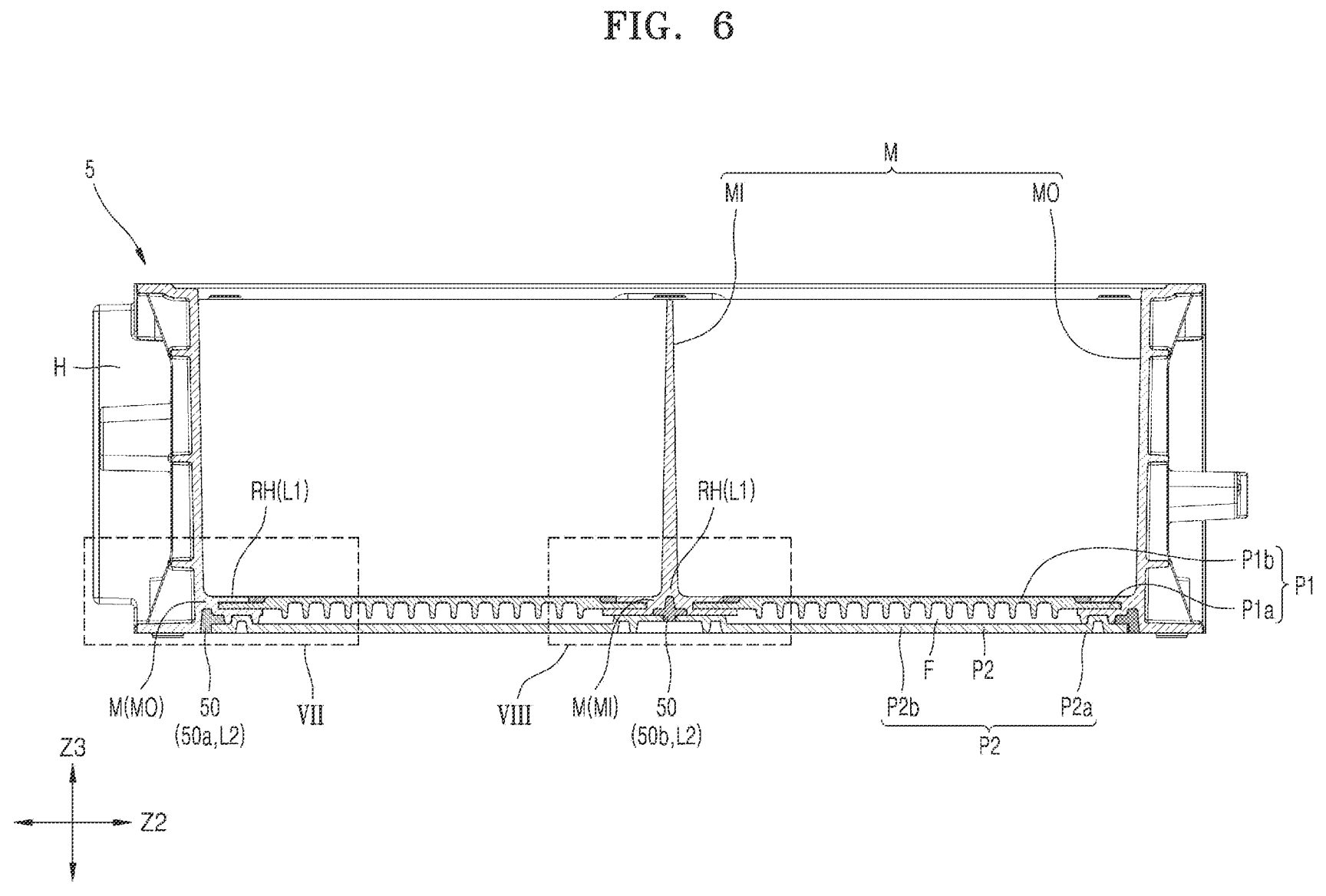
Figure 7:
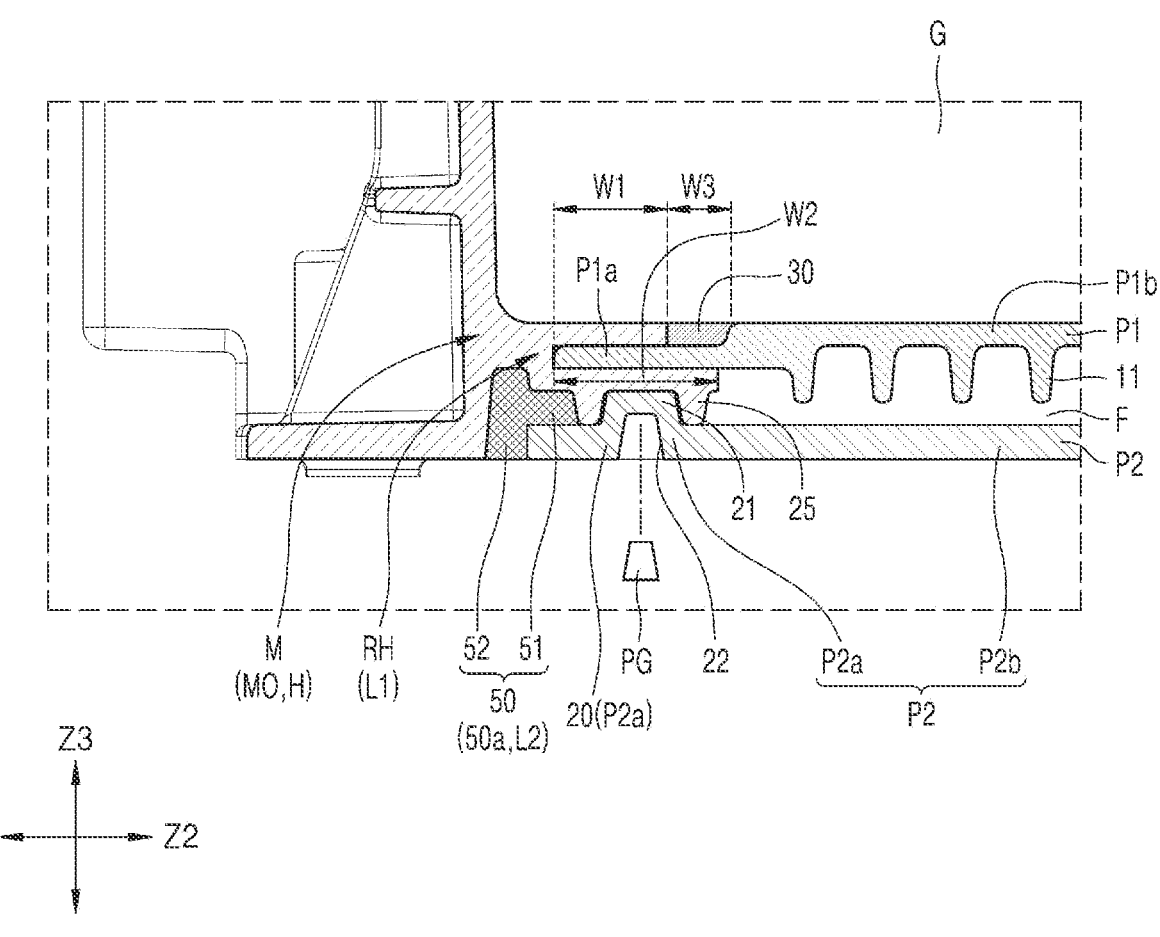
FIG. 7 is an enlarged cross-sectional view of a portion VII of FIG. 6.
Figure 8:
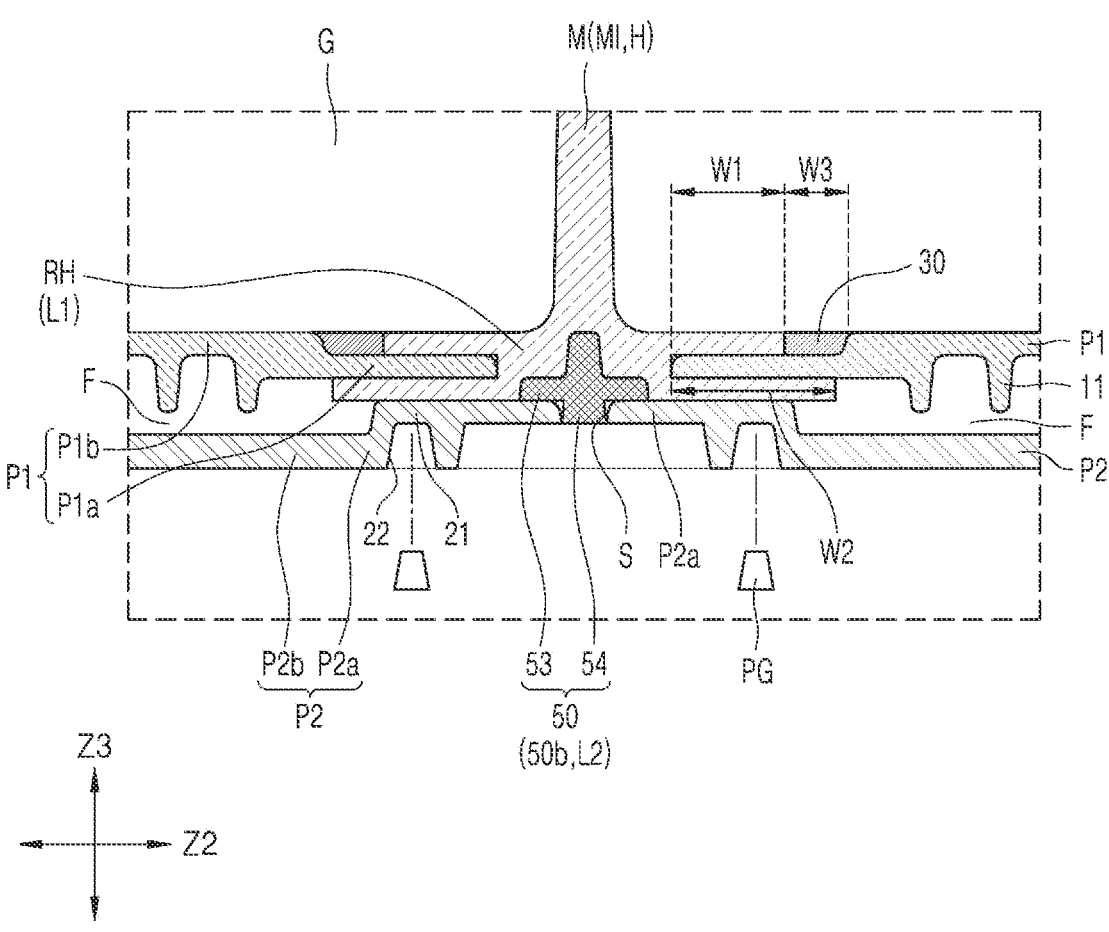
FIG. 8 is an enlarged cross-sectional view of a portion VIII of FIG. 6.

FIG. 1 is an exploded perspective view of a battery module 1 according to some embodiments. FIG. 2 is a perspective view of a module housing of FIG. 1. FIG. 3 is a perspective view of a battery assembly of FIG. 1. FIG. 4 is a plan view of a first coupling line for coupling a first plate of FIG. 1. FIG. 5 is a plan view of a second coupling line for coupling a second plate of FIG. 1. FIG. 6 is a cross-sectional view of a module housing taken along the line VI-VI of FIG. 2. FIG. 7 is an enlarged cross-sectional view of a portion VII of FIG. 6. FIG. 8 is an enlarged cross-sectional view of a portion VIII of FIG. 6.

Referring to FIGS. 1 to 6, the battery module 1 may include at least one battery assembly or cell stack B and a module housing 5 for accommodating the battery assembly B. The module housing 5 may include a main housing H including a main edge part M surrounding an accommodation space G for accommodating the battery assembly B, a first plate P1 including a first edge part P1*a* coupled to the main edge part M and a first exposure part P1*b* exposed from the main edge part M to define one side of a cooling path F for cooling the accommodation space G, and a second plate P2 arranged to face the first plate P1 and including a second edge part P2*a* coupled to the main edge part M and a second exposure part P2*b* exposed from the main edge part M and defining the other side of the cooling path F.

The main housing H, which forms the accommodation space G for the battery assembly B, may partition a plurality of accommodation spaces G for accommodating the battery assembly B that are different from each other, and may include the main edge part M surrounding the accommodation spaces G. According to some embodiments, the main housing H may include first to fourth accommodation spaces G1, G2, G3, and G4 for respectively accommodating the battery assemblies B that are different from each other, and the main edge part M may surround the first to fourth accommodation spaces G1, G2, G3, and G4 that are different from each other. The number of accommodation spaces is not limited to four, however, and various embodiments may include additional accommodation spaces or fewer accommodation spaces without departing from the spirit and scope of embodiments according to the present disclosure.

According to some embodiments, while surrounding the accommodation spaces G different from each other, the main edge part M may further partition a circuit space CS for accommodating a circuit portion between the accommodation spaces G neighboring each other. For example, according to some embodiments, the circuit space CS may be formed between first and fourth accommodation spaces G1 and G4 neighboring each other in a first direction Z1, and between second and third accommodation spaces G2 and G3 neighboring each other in the first direction Z1. Through the present specification, the first direction Z1 may correspond to the lengthwise direction of the battery assembly B or the lengthwise direction of the accommodation space G for accommodating the battery assembly B, and in the battery assembly B including a plurality of battery cells C arranged in one direction, may correspond to one direction in which the battery cells C are arranged.

The main housing H may include the main edge part M surrounding the accommodation space G for accommodating the battery assembly B. According to some embodiments, the main edge part M may mean a wall body of the main housing H formed along the circumference of the battery assembly B. According to some embodiments, the main edge part M may refer to a wall body surrounding the accommodation space G formed in a cuboid shape to surround the battery assembly B of about a cuboid shape. The wall body forming the main edge part M may refer to a wall body that faces the respective side parts of a front surface, a rear surface, and side surfaces of the battery assembly B, except an upper surface and a lower surface of the battery assembly B. The wall body may include not only portions facing the respective side parts of the battery assembly B, but also a portion facing a portion of the lower surface connected to the respective side parts of the battery assembly B, and may also include a portion extending from the wall body facing the respective side parts of the battery assembly B to face the lower surface, for example, a portion of the lower surface, of the battery assembly B. According to some embodiments, the side parts of the battery assembly B may mean a side part connecting the upper surface and the lower surface of the battery assembly B, except the upper surface from which an electrode terminal T (see FIG. 3) of the battery assembly B protrudes and the lower surface of the battery assembly B opposite to the upper surface. The main edge part M may form the accommodation space G for the battery assembly B by surrounding the respective side parts of the battery assembly B. As described above, the main edge part M, mainly facing the side parts of the battery assembly B, may extend to face a portion of the lower surface connected to the side parts of the battery assembly B.

The main edge part M may include a main inner edge part MI formed between the accommodation spaces G neighboring each other and a main outer edge part MO surrounding the accommodation spaces G neighboring each other overall across the accommodation spaces G neighboring each other. The main outer edge part MO may be formed along the outside of the main housing H, and the main inner edge part MI may be formed inside the main housing H.

The main inner edge part MI may be formed between the first and second accommodation spaces G1 and G2 neighboring each other in a second direction Z2, between the third and fourth accommodation spaces G3 and G4 neighboring each other in the second direction Z2, between the first and fourth accommodation spaces G1 and G4 neighboring each other in the first direction Z1, and between the second and third accommodation spaces G2 and G3 neighboring each other in the first direction Z1. The first direction Z1 may correspond to the lengthwise direction of the battery assembly B or the lengthwise direction of the accommodation space G for accommodating the battery assembly B, and the second direction Z2, which is a direction crossing the first direction Z1, may correspond to the width direction of the battery assembly B or the width direction of the accommodation space G for accommodating the battery assembly B.

The main inner edge part MI may be formed as a single-walled body between the first and second accommodation spaces G1 and G2 neighboring each other in the second direction Z2, and between the third and fourth accommodation spaces G3 and G4 neighboring each other in the second direction Z2, and as a dual-walled body between the first and fourth accommodation spaces G1 and G4 neighboring each other in the first direction Z1, and between the second and third accommodation spaces G2 and G3 neighboring each other in the first direction Z1. According to some embodiments, the dual-walled body between the first and fourth accommodation spaces G1 and G4 may be arranged with the circuit space CS therebetween, and similarly, the dual-walled body between the second and third accommodation spaces G2 and G3 may be arranged with the circuit space CS therebetween. For example, the circuit space CS may be connected, with one space, between the first and fourth accommodation spaces G1 and G4 and between the second and third accommodation spaces G2 and G3. According to some embodiments, a circuit portion electrically connected to a plurality of battery assemblies B may be arranged in the circuit space CS. According to some embodiments, a configuration such as the circuit portion electrically connected to the battery assemblies B, for example, a busbar to electrically connect the battery assemblies B to each other, and the like, may be arranged in the circuit space CS. According to some embodiments, the main inner edge part MI may mean an inner wall body of the main housing H arranged in each of the spaces partitioned in the main housing H, that is, between the first to fourth accommodation spaces G1, G2, G3, and G4 neighboring each other and the circuit space CS. Through the present specification, among the main inner edge part MI, in the main inner edge part MI formed as a dual-walled body between the first and fourth accommodation spaces G1 and G4 in the first direction Z1, and between the second and third accommodation spaces G2 and G3 in the first direction Z1, each single-walled body may be referred to as the main inner edge part MI, or the dual-walled body may be collectively referred to as the main inner edge part MI.

The main outer edge part MO may mean an outer wall body forming the main housing H, and a wall body that surround the first to fourth accommodation spaces G1, G2, G3, and G4 partitioned by the main housing H, and the circuit space CS, overall. According to some embodiments, the main outer edge part MO may correspond to the outer wall body of the main housing H that extends across the first to fourth accommodation spaces G1, G2, G3, and G4 neighboring each other, and surrounds the first to fourth accommodation spaces G1, G2, G3, and G4 overall.

According to some embodiments, each of the first to fourth accommodation spaces G1, G2, G3, and G4 may be surrounded by a combination of the main outer edge part MO and the main inner edge part MI, and for example, as the main outer edge part MO in the form of bending and the main inner edge part MI in the form of bending, which are formed at positions diagonally facing each other across the respective accommodation spaces G, are in contact with each other, each of the first to fourth accommodation spaces G1, G2, G3, and G4 may be partitioned. The first plate P1, which is individually formed for each of the first to fourth accommodation spaces G1, G2, G3, and G4, may form a coupling line with the main outer edge part MO in the form of bending and the main inner edge part MI in the form of bending that are formed at positions facing each other in a diagonal direction across each accommodation space G. For example, the first plate P1 in the first accommodation space G1 may form a coupling line with the main outer edge part MO in the form of bending and the main inner edge part MI in the form of bending that are formed at positions facing each other in a diagonal direction across the first accommodation space G1. As described below, the first plate P1 may form a first coupling line L1 by a recessed holding portion RH (see FIGS. 7 and 8) and each of the main outer edge part MO and the main inner edge part MI.

Through the present specification, the first coupling line L1 may mean a coupling line for fixing the position of the first plate P1 by the recessed holding portion RH. The recessed holding portion RH may fix the position of the first plate P1 by continuously surrounding an upper surface, a lower surface, and a side surface of the first edge part P1a formed along an edge of the first plate P1. The technical matter of the recessed holding portion RH is described below in more detail.

According to some embodiments, the second plate P2, which is commonly formed for the accommodation space G overall, may form a second coupling line L2 with the main outer edge part MO. For example, the second plate P2 may form the second coupling line L2 by a sealing portion 50 (see FIGS. 7 and 8) provided between the main outer edge part MO and the second plate P2. Through the present specification, the second coupling line L2 may mean a coupling line for fixing the position of the second plate P2 through the sealing portion 50. The sealing portion 50 may be provided between the main outer edge part MO and the second edge part P2a formed along an edge of the second plate P2, thereby mediating the coupling therebetween. The technical mater of the sealing portion 50 is described below in more detail.

According to some embodiments, the edge of the second plate P2 is a portion formed along the periphery of the second plate P2, and a portion around an elongated slot S formed inside the second plate P2 may not correspond to the edge of the second plate P2. As described below, the second edge part P2a formed in the second plate P2 may include the second edge part P2a formed along the edge of the second plate P2 and the second edge part P2a formed around the elongated slot S that is formed inside the second plate P2, but the portion around the elongated slot S formed inside the second plate P2 may not correspond to the edge of the second plate P2.

According to some embodiments, while forming the second coupling line L2 with the main outer edge part MO, the second plate P2 may form the second coupling line L2 with the main inner edge part MI. The second plate P2, which is commonly formed for the accommodation space G overall and forms a common base with respect to the entire accommodation space G, may form the second coupling line L2 with the main outer edge part MO. According to some embodiments, to increase a position fixing force of the second plate P2, the elongated slot S is formed inside the second plate P2, and the second coupling line L2 may be formed along the second edge part P2a around the elongated slot S. In other words, the second coupling line L2 may include the second coupling line L2 for the coupling to the main outer edge part MO along the edge of the second plate P2, and the second coupling line L2 for the coupling to the main inner edge part MI around the elongated slot S of the second plate P2. According to some embodiments, the elongated slot S may be formed in the first direction Z1, formed long along the main inner edge part MI, and may form the second coupling line L2 with the main inner edge part MI.

The elongated slot S may extend in the first direction Z1 along the main inner edge part MI and extend along between the first and second accommodation spaces G1 and G2 and the third and fourth accommodation spaces G3 and G4, neighboring each other. According to some embodiments, the elongated slot S may include a plurality of elongated slots S that are apart from one another in the first direction Z1, and according to some embodiments, may include three elongated slots S apart from one another. In this state, a bridge BR (see FIG. 1) may be formed between the elongated slots S neighboring each other in the first direction Z1.

As the second plate P2 is formed in a large area across the entire area of the module housing 5 to cover the first to fourth accommodation spaces G1, G2, G3, and G4 overall, the stiffness of the second plate P2 may be maintained through the bridge BR formed between the elongated slots S neighboring each other, and to prevent or reduce bending of the second plate P2 by an external shock applied in the second direction Z2 crossing the first direction Z1, the bridge BR may be formed between the elongated slots S neighboring each other. Accordingly, the elongated slot S extending in the first direction Z1 is discontinued at the bridge BR, and may include a plurality of elongated slots S apart from each other in the first direction Z1.

According to some embodiments, the first plate P1 may form a bottom of the accommodation space G for accommodating the battery assembly B and also form the cooling path F for cooling the lower surface of the battery assembly B facing the bottom of the accommodation space G, may be individually formed for each accommodation space G, and may not be formed in the circuit space CS that is not the accommodation space G for accommodating the battery assembly B. Accordingly, the first plate P1 may not form the bottom in the circuit space CS, and the main housing H surrounding the first plate P1 may form the bottom of the circuit space CS. For example, according to some embodiments, while closing an opening formed in the main housing H corresponding to each of the first to fourth accommodation spaces G1, G2, G3, and G4, the first plate P1 may form the bottom of each of the first to fourth accommodation spaces G1, G2, G3, and G4. In other words, the bottom of the circuit space CS may be formed by the main housing H between the openings corresponding to the first to fourth accommodation spaces G1, G2, G3, and G4.

The second coupling line L2 may be formed along the second edge part P2a formed at the edge of the second plate P2 and the second edge part P2a formed around the elongated slot S. While the second edge part P2a formed at the edge of the second plate P2 forms the second coupling line L2 with the main outer edge part MO, the second edge part P2a formed around the elongated slot S forms the second coupling line L2 with the main inner edge part MI. Accordingly, the position fixing force of the second plate P2 may be increased through the second coupling lines L2 formed inside and outside the second plate P2. The second coupling line L2 may form a coupling to the second edge part P2a formed at the edge of the second plate P2 and to the second edge part P2a formed around the elongated slot S. In this state, the second coupling line L2 formed along the edge of the second plate P2 may have a closed loop shape surrounding the edge of the second plate P2, and the second coupling line L2 formed around the elongated slot S may have a stripe shape along the elongated slot S that extends long along the main inner edge part MI. As such, the second coupling line L2 may be formed along the edge of the second plate P2 and also formed along the perimeter of the elongated slot S of the second plate P2. in this state, the second coupling line L2 formed along the edge of the second plate P2 and the second coupling line L2 formed along the perimeter of the elongated slot S of the second plate P2 may have different cross-sectional structures. For example, on a cross-section taken in the second direction Z2, a cross-sectional structure of the second coupling line L2 formed along the edge of the second plate P2, or the sealing portion 50 forming the second coupling line L2 (see FIG. 7) may be different from a cross-sectional structure of the second coupling line L2 formed around the elongated slot S of the second plate P2, or the sealing portion 50 forming second coupling line L2 (see FIG. 8). This is because the second coupling line L2 formed along the edge of the second plate P2, or the sealing portion 50 (see FIG. 7), forms a coupling to the second edge part P2a formed at the edge of the second plate P2, but the second coupling line L2, or the sealing portion 50 (see FIG. 8), formed along the perimeter of the elongated slot S of the second plate P2 forms a coupling to two second edge parts P2a formed at both sides of the elongated slot S. For example, the second coupling line L2 formed along the edge of the second plate P2, or the sealing portion 50, forms a coupling to one second edge part P2a formed at the edge of the second plate P2, thereby having an asymmetrical cross-sectional structure, and the second coupling line L2, or the sealing portion 50, formed along the perimeter of the elongated slot S of the second plate P2 may form a coupling to two second edge parts P2a formed at both sides of the elongated slot S, thereby having a symmetrical cross-sectional structure. A cross-sectional structure of the second coupling line L2, or the sealing portion 50, is described below in more detail. For reference, through the present specification, as illustrated in FIG. 5, in the second edge parts P2a formed at both sides of the elongated slot S, the second edge parts P2a formed at the one side and the other side of the elongated slot S may be respectively referred to as the second edge part P2a, or a pair of second edge parts P2a formed at both sides of the elongated slot S may be collectively referred to as the second edge part P2a.

The main housing H may include the main edge part M surrounding each of the accommodation spaces G different from each other, and the opening surrounded by the main edge part M. For example, the opening may be formed for each accommodation space G. The opening may be formed at the bottom of the accommodation space G corresponding to the lower surface of the battery assembly B, and the main edge part M may surround the opening formed in each accommodation space G. In this state, the lower surface of the battery assembly B may face mainly the opening, and face part of the main edge part M surrounding the opening.

The opening of the main housing H may be closed by the first plate P1. For example, the first plate P1 may include a plurality of first plates P1 arranged in the first to fourth accommodation spaces G1, G2, G3, and G4, respectively. In other words, the opening formed in each of the first to fourth accommodation spaces G1, G2, G3, and G4 may be closed by the first plates P1 individually formed for each of the first to fourth accommodation spaces G1, G2, G3, and G4. The first plates P1 may form the bottom of the accommodation space G, and respectively provide a support base for supporting the battery assembly B accommodated in each of the first to fourth accommodation spaces G1, G2, G3, and G4. The first plate P1 may form the first coupling line L1 by being coupled to the main edge part M that surrounds the opening to close the opening.

According to some embodiments, the first plate P1 may be coupled to the main edge part M through the first coupling line L1 and, for example, the position of the first plate P1 may be fixed as the upper surface, lower surface, and side surfaces of the first edge part P1a formed at the edge of the first plate P1 may be continuously surrounded through the recessed holding portion RH (see FIGS. 7 and 8) of the main edge part M. According to some embodiments, the first edge part P1a formed at the edge of the first plate P1, in the form of being embedded in the main edge part M, may form the first coupling line L1 with the main edge part M. For example, the first edge part P1a of the first plate P1 may be embedded by the main edge part M so as not to be exposed from the main edge part M, and as at least the upper surface and the lower surface of the first edge part P1a is covered by the main edge part M, the first edge part P1a may not be exposed from the main edge part M. According to some embodiments, the upper surface and the lower surface of the first edge part P1a, and the side surfaces connecting the upper surface and the lower surface, may be surrounded by the main edge part M, and the main edge part M may include the recessed holding portion RH, in the form of a concave, for accommodating the first edge part P1a by continuously surrounding the upper surface, lower surface, and side surfaces of the first edge part P1a.

The first plate P1 may include the first edge part P1a coupled to the main edge part M and the first exposure part P1b exposed from the main edge part M. The first exposure part P1b, which is exposed from the main edge part M, may be exposed to the accommodation space G surrounded by the main edge part M. As described below, the first exposure part P1b, which is exposed toward the accommodation space G, may form the cooling path F for cooling the battery assembly B accommodated in the accommodation space G. In other words, as the first edge part P1a of the first plate P1 forms a coupling to the main edge part M and the first exposure part P1b of the first plate P1 extends out of the main edge part M, the cooling path F of the accommodation space G, or the battery assembly B accommodated in the accommodation space G, surrounded by the main edge part M may be formed. As described in more detail below, the cooling path F may be formed between the first plate P1 forming the bottom of the accommodation space G and the second plate P2 arranged to face the first plate P1, and the first plate P1 may cool the battery assembly B by mediating heat transfer between the lower surface of the battery assembly B and the cooling path F. According to some embodiments, the first plate P1 may include a metal material having excellent heat conduction properties, for example, an aluminum material, to promote the heat transfer between the battery assembly B and the cooling path F. According to some embodiments, the first plate P1 may include a metal material different from a resin material forming the main housing H, and the first plate P1 may be integrally formed with the main housing H through insert molding. In this state, the first plate P1 may be individually formed with respect to each of the accommodation spaces G, and may be individually formed with respect to the accommodation spaces G neighboring each other and may block thermal interference or electrical interference between the battery assemblies B that are different from each other and accommodated in the accommodation spaces G neighboring each other. As such, the first plate P1 individually formed with respect to each of the accommodation spaces G may form a support base of the battery assembly B accommodated in each accommodation space G, and may be firmly fixed in position through the first coupling line L1 surrounding each accommodation space G. For example, the first coupling line L1 may be formed in a closed loop shape surrounding each accommodation space G.

The second plate P2, which may be arranged to face the first plate P1, may form the cooling path F with the first plate P1. For example, the first and second plates P1 and P2 may be arranged to face each other in a third direction Z3. The third direction Z3 may mean a direction crossing the first and second directions Z1 and Z2, and correspond to, for example, the height direction of the accommodation space G crossing the first direction Z1 corresponding to the lengthwise direction of the accommodation space G and the second direction Z2 corresponding to the width direction of the accommodation space G. For example, the third direction Z3 may correspond to the height direction of the battery assembly B in which the upper surface and the lower surface of the battery assembly B face each other.

The second plate P2 may be arranged at a position lower than the first plate P1, and may be fixed in position through the coupling to the main edge part M, like the first plate P1. According to some embodiments, the second plate P2 may include the second edge part P2a coupled to the main edge part M and the second exposure part P2b exposed from the main edge part M. According to some embodiments, the second plate P2 may include the second edge part P2a formed along the edge of the second plate P2 and the second edge part P2a formed along the perimeter of the elongated slot S of the second plate P2. The second edge parts P2a may form a coupling to the main edge part M by providing the sealing portion 50 (see FIGS. 7 and 8) therebetween, and form the second coupling line L2.

The second plate P2 may be commonly formed with respect to the accommodation space G as a whole, and may extend across the accommodation spaces G. In this state, the second plate P2 may form a coupling to the main outer edge part MO through the second edge part P2a formed at the edge, and to the main inner edge part MI through the second edge part P2a formed around the elongated slot S. In other words, the second edge part P2a of the second plate P2 may form the second coupling line L2 with each of the main outer edge part MO and the main inner edge part MI. As such, the second edge part P2a may form a coupling to the main edge part M through the second coupling line L2, and the cross-sectional structure of the second coupling line L2 may be different at the second coupling line L2 (see FIG. 7) formed along the edge of the second plate P2 and the second coupling line L2 (see FIG. 8) formed along the perimeter of the elongated slot S of the second plate P2. While the second coupling line L2 (see FIG. 7) formed along the edge of the second plate P2 forms a coupling to one second edge part P2a formed at the edge of the second plate P2, the second coupling line L2 (see FIG. 8) formed along the elongated slot S of the second plate P2 forms a coupling to two second edge parts P2a formed at both sides of the elongated slot S, with respect to the elongated slot S of the second plate P2. For example, the second coupling line L2 (see FIG. 7) formed along the edge of the second plate P2 may have an asymmetrical cross-sectional structure, and the second coupling line L2 (see FIG. 8) formed along the perimeter of the elongated slot S of the second plate P2 may have a symmetrical cross-sectional structure. The cross-sectional structure may correspond to a cross-sectional structure taken across the second coupling line L2 in the second direction Z2 corresponding to the width direction of the accommodation space G.

The second plate P2 may form the cooling path F with the first plate P1. For example, the first and second plates P1 and P2 may be separated from each other in the third direction Z3 corresponding to the height direction of the accommodation space G, and the cooling path F having a size as large as a gap between the first and second plates P1 and P2 apart from each other may be formed. The first plate P1 may be in contact with the lower surface of the battery assembly B and mediate the heat transfer between the battery assembly B and the cooling path F, and may include a metal material having excellent heat conduction properties. The second plate P2 may have thermal insulation properties to reduce or prevent heat transfer between the cooling path F and the ground and prevent or reduce cool air of the cooling path F being transferred to the ground. According to some embodiments, the second plate P2 may be formed of a resin material, and considering a coupling force between the second plate P2 and the main housing H, may be formed of a resin material of a same kind as the main housing H. As described in more detail below, the second coupling line L2 that mediates the coupling between the second plate P2 and the main housing H may be formed by the sealing portion 50 (see FIGS. 7 and 8) provided between the second plate P2 and the main housing H, and the sealing portion 50 may be formed of a resin material of a same kind as the second plate P2 and the main housing H that are subject to a coupling. Accordingly, the main housing H and the second plate P2 that are formed of a resin material of a same kind may be firmly coupled to each other by providing the sealing portion 50 formed of the resin material of a same kind therebetween. However, embodiments according to the present disclosure are not limited thereto, and for example, the main housing H and the second plate P2 may include a flame retardant material, and the sealing portion 50 may not include a flame retardant material. As the sealing portion 50 is formed in a relatively small volume, unlike the main housing H and the second plate P2, even when the sealing portion 50 does not include a flame retardant material, emergency situations such as fires or explosions may be avoided, and as described in more detail below, as the sealing portion 50 is formed at a position bordering the outside of the main housing H, additional sealing properties are required so that the sealing portion 50 may be formed of a material different from the material of the main housing H or the second plate P2.

The module housing 5 according to some embodiments may be formed by a die slide injection (DSI) method. For example, after the main housing H and the first plate P1 formed of heterogeneous materials are integrally formed through primary molding adopting insert molding, the sealing portion 50 for coupling the primary molding body and the second plate P2, the primary molding body incorporating the main housing H and the first plate P1, may be formed through secondary molding. For example, according to some embodiments, while forming the primary molding body incorporating the main housing H and the first plate P1 formed of heterogeneous materials through the primary molding, simultaneously (or concurrently), the second plate P2 may be formed. In this state, the simultaneously (or concurrently) forming of the primary molding body incorporating the main housing H and the first plate P1 through the primary molding and the second plate P2 may mean that, even when the primary molding body and the second plate P2 are formed through different molding jigs, molding processes may be simultaneously (or concurrently) performed in different molding jigs arranged adjacent to each other.

The module housing 5 may be formed by the DSI method in which, in the secondary molding performed after the primary molding, molding jigs at positions adjacent to each other slide to approach each other and the primary molding body and the second plate P2 are moved to be in contact with each other, and then a sealing material is injected between the primary molding body and the second plate P2. In other words, the second plate P2 may be formed through the primary molding. The second plate P2 formed in the primary molding may slide to be in contact with the primary molding body incorporating the main housing H and the first plate P1 in the secondary molding following the primary molding, and as the sealing material is injected between the second plate P2 and the primary molding body, the module housing 5 as a whole may be completed.

In this state, in the secondary molding in which the sealing material is injected, the second plate P2 in a state of stably being supported on the molding jig needs to firmly maintain a regular position in contact with the primary molding body. When the second plate P2 is deviated from the regular position, a coupling position between the second plate P2 and the primary molding body may be disturbed so that leakage may occur in the cooling path F formed by the second plate P2. As described in more detail below, according to some embodiments, to stably maintain the coupling position of the second plate P2, a jig groove 22 (see FIGS. 7 and 8) is formed in the second plate P2, and a pressing part PG of the molding jig is inserted in the jig groove 22 of the second plate P2, and thus the coupling position of the second plate P2 may be firmly fixed, and the coupling position between the second plate P2 and the primary molding body may be maintained properly. The technical matter regarding the jig groove 22 is described below in more detail.

In the following description, the first coupling line L1 for forming the coupling between the main housing H and the first plate P1, and the cross-sectional structure of the second coupling line L2 for forming the coupling between the main housing H and the second plate P2, are described with reference to FIGS. 7 and 8. According to some embodiments, the cross-sectional structures of the first and second coupling lines L1 and L2 may correspond to the cross-sectional structures of the first and second coupling lines L1 and L2 taken in the second direction Z2 corresponding to the width direction of the accommodation space G.

The first and second coupling lines L1 and L2 may include the first and second coupling lines L1 and L2 forming the coupling to the main outer edge part MO and the first and second coupling lines L1 and L2 forming the coupling to the main inner edge part MI. In the following description, after the cross-sectional structures of the first and second coupling lines L1 and L2 forming the coupling to the main outer edge part MO are described, the cross-sectional structures of the first and second coupling lines L1 and L2 forming the coupling to the main inner edge part MI are described.

For reference, in the following description, although the main edge part M is described as being divided into the main outer edge part MO and the main inner edge part MI, unless mentioned otherwise, the technological matter regarding the main outer edge part MO may be equally applied to the main inner edge part MI, and reversely, the technological matter regarding the main inner edge part MI may be equally applied to the main outer edge part MO.

Referring to FIG. 7, the first coupling line L1 may include the coupling between the main outer edge part MO and the first edge part P1a of the first plate P1. According to some embodiments, the main outer edge part MO may include the recessed holding portion RH forming the coupling to the first edge part P1a of the first plate P1. The recessed holding portion RH may be formed to be concave to continuously cover the upper surface, lower surface, and side surfaces of the first edge part P1a, thereby embedding the first edge part P1a. As such, the recessed holding portion RH may firmly fix the position of the first edge part P1a by continuously covering the upper surface, lower surface, and side surfaces of the first edge part P1a, and the recessed holding portion RH may be formed through insert molding or the primary molding, thereby integrally forming the first plate P1 and the main housing H.

The first plate P1 forms the cooling path F with the second plate P2, and when the coupling force between the first plate P1 and the main housing H decreases or a gap occurs therebetween, a high-pressure cooling medium flowing in the cooling path F may leak. Thus, according to some embodiments, through the recessed holding portion RH that is formed to be concave to continuously cover the first plate P1, that is, the upper surface, lower surface, and side surfaces of the first edge part P1a, a contact area between the main outer edge part MO and the first edge part P1a may be increased and coupling strength of the first edge part P1a may be increased.

An upper surface of the first edge part P1a covered by the recessed holding portion RH may form an upper surface of the first plate P1 with an upper surface of the first exposure part P1b facing the accommodation space G. Furthermore, a lower surface of the first edge part P1a covered by the recessed holding portion RH may form a lower surface of the first plate P1 with a lower surface of the first exposure part P1b facing the cooling path F.

The recessed holding portion RH may include an upper width W1 covering the upper surface of the first edge part P1a and a lower width W2 covering the lower surface of the first edge part P1a. According to some embodiments, the lower width W2 may be greater than the upper width W1, that is, the lower width W2 in the second direction Z2 may be relatively great. In this state, a filling width W3 may be formed on the first edge part P1a out of the upper width W1 that is relatively narrow. According to some embodiments, the filling width W3 may be formed from the first edge part P1a out of the upper width W1 to a boundary with the first exposure part P1b, and may be formed on the first edge part P1a from the first edge part P1a out of the upper width W1 to the boundary with the first exposure part P1b. A filler 30 may be formed in the filling width W3, and the filler 30 formed in the filling width W3 may reinforce the coupling strength between the main outer edge part MO and the first edge part P1a. In other words, as the filler 30 reinforces the coupling strength between the main housing H including the main outer edge part MO and the first plate P1 including the first edge part P1a, the coupling therebetween may be firmly maintained. In this state, as a step is formed at both ends of the filling width W3 in the thickness direction (third direction Z3) of the first plate P1, a filling space in the form of a concave filled with the filler 30 may be formed. At one end of the filling width W3, the filling space may be defined by a step between the main outer edge part MO forming the upper width W1 and the first edge part P1a, and at the other end of the filling width W3, the filling space may be defined by a step between the first edge part P1a and the first exposure part P1b.

According to some embodiments, the first edge part P1a and the first exposure part P1b forming the first plate P1 may be connected to each other in the form of a step in the thickness direction (third direction Z3) of the first plate P1. According to some embodiments, the first exposure part P1b may include an upper surface stepped upward from the first edge part P1a, and may be thicker than the first edge part P1a. As described above, the step between the first exposure part P1b and the first edge part P1a forming the first plate P1 may define the filling space to be filled with the filler 30.

The first plate P1, closing the opening surrounded by the main edge part M, may form the bottom of the accommodation space G facing the lower surface of the battery assembly B, with the main edge part M, and the first exposure part P1*b* of the first plate P1 exposed to the accommodation space G may form the cooling path F for cooling the lower surface of the battery assembly B. In other words, the first exposure part P1*b* may include the upper surface exposed to the accommodation space G for accommodating the battery assembly B and the lower surface exposed to the cooling path F, and may mediate the heat transfer between the battery assembly B and the cooling path F.

The first and second plates P1 and P2 may include the first and second edge parts P1*a* and P2*a* for forming the coupling to the main edge part M and the first and second exposure parts P1*b* and P2*b* exposed from the main edge part M, respectively. In this state, the cooling path F may be formed between the first and second exposure parts P1*b* and P2*b*. In other words, the cooling path F may be formed between the lower surface of the first exposure part P1*b* and the upper surface of the second exposure part P2*b*, and a heat radiation fin 11 for increasing a contact area with a cooling fluid flowing in the cooling path F may be formed on the lower surface of the first exposure part P1*b*. For example, the heat radiation fin 11 of the first exposure part P1*b* may protrude toward the second exposure part P2*b* facing the first exposure part P1*b* and forming the cooling path F. As described below, the cooling path F may be formed in the first direction Z1 corresponding to the lengthwise direction of the accommodation space G, and a coolant pipe PL for supplying the cooling medium to the cooling path F or collecting the cooling medium from the cooling path F may be arranged in the first direction Z1 at the front surface and the rear surface of the module housing 5. In this state, the heat radiation fin 11 formed on the first plate P1 (the first exposure part P1*b*) may be formed in the first direction Z1 along the cooling path F.

The second coupling line L2 may include the coupling between the main outer edge part MO and the second edge part P2*a* of the second plate P2. In this state, the sealing portion 50 is provided between the main outer edge part MO and the second edge part P2*a* to mediate the coupling therebetween. According to some embodiments, the second edge part P2*a* may include a flat panel part 20 coupled to the main outer edge part MO via the sealing portion 50, and a protruding step part 21 formed between the flat panel part 20 and the second exposure part P2*b*. The second edge part P2*a* may be aligned with the main outer edge part MO through the protruding step part 21, and may form the coupling to the main outer edge part MO through the flat panel part 20.

In connection with the position alignment between the second edge part P2*a* and the main outer edge part MO, the second edge part P2*a* and the main outer edge part MO may be aligned with each other as the protruding step part 21 of the second edge part P2*a* is inserted between a pair of protruding parts 25 formed on the main outer edge part MO. According to some embodiments, in the main outer edge part MO, the pair of protruding parts 25 protruding toward both sides of the protruding step part 21 may be formed in the lower width W2 covering the lower surface of the first edge part P1*a*, and as the protruding step part 21 is inserted between the pair of protruding parts 25, the position alignment may be formed between the main outer edge part MO where the pair of protruding parts 25 are formed and the second edge part P2*a* where the protruding step part 21 is formed.

The protruding step part 21 may include an upper surface protruding upward and a concave lower surface recessed downward (corresponding to the jig groove 22), and may have the position alignment with the main outer edge part MO through the protruding upper surface, and also may firmly fix the coupling position of the second plate P2 through the concave lower surface (corresponding to the jig groove 22). The protruding upper surface of the protruding step part 21 may contribute to the position alignment with the main outer edge part MO, and simultaneously (or concurrently), may be provided between the sealing portion 50 and the cooling path F to prevent or reduce leakage of the sealing material for forming the sealing portion 50 into the cooling path F, which might otherwise clog the cooling path F. The protruding step part 21, which is formed between the flat panel part 20 where the sealing portion 50 is formed and the first exposure part P1*b* forming the cooling path F, may prevent or reduce clogging of the cooling path F due to the leakage of the sealing portion 50.

The protruding step part 21 may be formed in the shape of press forming including the protruding upper surface and the concave lower surface, and the pressing part PG of the molding jig may be inserted in the jig groove 22 formed by the concave lower surface. In the manufacture of the module housing 5 according to some embodiments, after forming the primary molding body incorporating the main housing H and the first plate P1 formed of heterogeneous materials through the primary molding corresponding to insert molding, the secondary molding for inserting the sealing material between the primary molding body and the second plate P2 may be continuously performed.

In this state, the second plate P2 formed in the primary molding slides to a position in contact with the primary molding body, and then in a state of being fixed at the position in contact with the primary molding body, a sealing material to couple the primary molding body to the second plate P2 is injected. To firmly fix the coupling position of the second plate P2 at a regular position, the secondary molding may be performed while the pressing part PG of the molding jig is inserted in the jig groove 22 of the second plate P2. In the primary molding according to some embodiments, while the primary molding body incorporating the main housing H and the first plate P1 is formed, the second plate P2 is simultaneously (or concurrently) formed, and the molding jig of the primary molding body and the molding jig of the second plate P2, which are apart from each other, are moved to close each other and thus the sealing material is injected in a state in which the primary molding body and the second plate P2 are fixed at positions in contact with each other. In this state, the coupling position of the second plate P2 may be firmly fixed though the pressing part PG of the molding jig inserted in the jig groove 22 of the second plate P2. When the position of the second plate P2 is disturbed in the secondary molding for forming the sealing portion 50, the leakage of the cooling path F formed by the second plate P2 may occur, and thus the leakage of the cooling path F may be prevented or reduced by firmly maintaining the coupling position through the jig groove 22 of the second plate P2.

Regarding the coupling between the second edge part P2*a* and the main outer edge part MO, the sealing portion 50 is provided between the second edge part P2*a* and the main outer edge part MO so that the second edge part P2*a* and the main outer edge part MO may be coupled to each other. The sealing portion 50 may allow the flat panel part 20 of the second edge part P2*a* and the main outer edge part MO to be coupled to each other by filling between the flat panel part 20 of the second edge part P2*a* and the main outer edge part MO. The sealing portion 50 may include a first sealing portion 51 filled between the flat panel part 20 of the second edge part P2*a* and the main outer edge part MO and a second sealing portion 52 extending across the first sealing portion 51 from a position bordering the outside of the main outer edge part MO in a direction crossing the first sealing portion 51.

The first sealing portion 51 may extend approximately in the surface direction (second direction Z2) of the flat panel part 20 or the second plate P2 including the flat panel part 20, and may be formed between the flat panel part 20 and the main outer edge part MO. The second sealing portion 52 may extend from the position bordering the outside of the main outer edge part MO in a direction crossing the first sealing portion 51, that is, approximately in the thickness direction (third direction Z3) of the flat panel part 20 or the second plate P2 including the flat panel part 20 to a position out of the second sealing portion 52 across the second sealing portion 52. The first and second sealing portions 51 and 52 may extend in the second and third directions Z2 and Z3 crossing each other, respectively, the first sealing portion 51 may be formed between the flat panel part 20 and the main outer edge part MO, and the second sealing portion 52 may extend from the position bordering the outside of the main outer edge part MO across the first sealing portion 51. Within the above limits, it may be sufficient that the first and second sealing portions 51 and 52 may extend in directions crossing each other, and the first and second sealing portions 51 and 52 may not need to extend in the surface direction (second direction Z2) of the flat panel part 20 or the second plate P2 including the flat panel part 20 and the thickness direction (third direction Z3) of the flat panel part 20 or the second plate P2 including the flat panel part 20, respectively. In other words, according to some embodiments, the first and second sealing portions 51 and 52 may extend approximately in the surface direction (second direction Z2) of the second plate P2 and approximately in the thickness direction (third direction Z3) of the second plate P2, respectively. However, the extension directions of the first and second sealing portions 51 and 52 may not be limited thereto, and it may be sufficient that the first and second sealing portions 51 and 52 extend in any directions crossing each other.

As described below, the sealing portion 50 may be formed by the sealing material injected between the main edge part M and the second edge part P2a that are position aligned with each other, and the sealing material may be injected from the position bordering the outside of the main outer edge part MO. The second sealing portion 52 being formed from the position bordering the outside of the main outer edge part MO may mean that, for the injection of the sealing material, the main outer edge part MO in the form of being open to the outside includes an injection space for the sealing material. For example, the injection space of the sealing material may have a shape matching the first and second sealing portions 51 and 52 from the position bordering the outside of the main outer edge part MO.

The second sealing portion 52 may extend approximately in a sealing material injection direction, that is, the second sealing portion 52 may extend from the position bordering the outside approximately in the third direction Z3, to facilitate the injection of the sealing material. The first sealing portion 51 may cross the second sealing portion 52 in the third direction Z3 at a middle position of the second sealing portion 52, for example, a position corresponding to the upper surface of flat panel part 20, so that generation of voids in which the sealing material is not filled due to the flowing of the sealing material for changing a direction at the position where the first and second sealing portions 51 and 52 cross each other may be prevented or reduced. For example, in systems in which the crossing position of the first and second sealing portions 51 and 52 is formed at the uppermost position of the second sealing portion 52 in the third direction Z3, the voids that are not filled with the sealing material may be formed at the position where the first and second sealing portions 51 and 52 cross each other due to the flowing of the sealing material for changing a direction.

As the second sealing portion 52 is formed at the position bordering the outside, the sealing material forming the second sealing portion 52 may have sealing properties to block external harmful materials. The first and second sealing portions 51 and 52 may include the same material through the injection of the same sealing material, and such a sealing material may include a material having excellent sealing properties capable of blocking the external harmful material.

The second plate P2 may be position aligned with respect to the main housing H through the pair of protruding part 25 inserted in the protruding step part 21 with the protruding step part 21 therebetween, and the position alignment of the second plate P2 may limit the size of the cooling path F limited by the second plate P2. For example, the cooling path F may be formed between the first and second plates P1 and P2, that is, the first and second exposure parts P1b and P2b of the first and second plates P1 and P2. In this state, the height of the cooling path F formed between the first and second exposure parts P1b and P2b may be determined according to the fit between the protruding step part 21 and the protruding part 25. For example, the size of the cooling path F formed with the first plate P1 may be determined according to the height of the second plate P2 determined according to the fit between the protruding step part 21 and the protruding part 25.

The first and second edge parts P1a and P2a may form the coupling to the main outer edge part MO, and may be coupled to the main outer edge part MO through the recessed holding portion RH of the main outer edge part MO and the sealing portion 50, respectively. The first and second edge parts P1a and P2a may be formed at positions where the first and second edge parts P1a and P2a at least partially overlap each other to overlap the lower width W2 of the main outer edge part MO provided therebetween.

Referring to FIG. 8, the first coupling line L1 may include the coupling between the main inner edge part MI and the first edge part P1a of the first plate P1. The first coupling line L1 may form a coupling to the two first plates P1 formed at both sides of the main inner edge part MI. Accordingly, the first coupling line L1 for forming the coupling to the main inner edge part MI may include a pair of recessed holding portions RH for forming couplings to the two first plates P1 arranged at both sides. Each of the recessed holding portions RH may form the coupling to each of the two first plates P1, and may be formed in the form of a concave to continuously cover the first edge part P1a of the upper surface, lower surface, and side surfaces of the first plate P1. Each of the recessed holding portions RH may include the upper width W1 covering the upper surface of the first edge part P1a and the lower width W2 covering the lower surface of the first edge part P1a, and the lower width W2 of the recessed holding portion RH may be formed wider in the second direction Z2 than the upper width W1, and the filling width W3 in which the filler 30 is formed may be formed on the first edge part P1a out of the upper width W1 that is relatively formed narrow.

Referring to FIG. 8, the second coupling line L2 may include a coupling between the main inner edge part MI and the second edge part P2a of the second plate P2. As the sealing portion 50 is provided between the main inner edge part MI and the second edge part P2*a*, the coupling therebetween may be mediated. The sealing portion 50 may form the coupling to the second edge part P2*a* formed along the perimeter of the elongated slot S of the second plate P2, and may be formed symmetrically for the coupling to the second edge parts P2*a* formed at both sides of the elongated slot S.

According to some embodiments, the sealing portion 50 may include a third sealing portion 53 extending between the second edge part P2*a* and the main inner edge part MI and a fourth sealing portion 54 extending from the elongated slot S of the second plate P2 in a direction crossing the third sealing portion 53. For example, the third sealing portion 53 may extend in the surface direction (second direction Z2) of the second plate P2, and the fourth sealing portion 54 may extend in a direction crossing the third sealing portion 53, for example, the thickness direction (third direction Z3) of the second plate P2. The fourth sealing portion 54 may extend from the elongated slot S of the second plate P2 toward the main inner edge part MI in the sealing material injection direction (third direction Z3), to facilitate the injection of the sealing material, and the third sealing portion 53 may cross the fourth sealing portion 54 in the extension direction (third direction Z3) of the fourth sealing portion 54 at the upper surface of the middle position (for example, a portion corresponding to the second edge part P2*a*), that is, at a middle position between the uppermost position and the lowermost position of the fourth sealing portion 54 in the third direction Z3, to prevent or reduce generation of voids that are not filled with the sealing material due to flowing of the sealing material according to a direction change at a position where the third and fourth sealing portions 53 and 54 cross each other.

In systems in which the third and fourth sealing portions 53 and 54 cross each other at the uppermost position in the extension direction (third direction Z3) of the fourth sealing portion 54, the voids that are not filled with the sealing material may be formed due to the flowing of the sealing material according to a direction change. As to the injection position of the sealing material, the sealing material may be injected from the elongated slot S of the second plate P2, and an injection space for the sealing material may be formed by extending from a position corresponding to the elongated slot S at the main inner edge part MI in contact with the elongated slot S of the second plate P2. The injection space of the sealing material may be formed from a position bordering the outside of the main inner edge part MI (or the elongated slot S of the second plate P2). For example, the injection space of the sealing material may have a shape matching the third and fourth sealing portions 53 and 54 from the position bordering the elongated slot S of the second plate P2.

The third sealing portion 53 may extend from both sides of the fourth sealing portion 54 in the second direction Z2. The third sealing portion 53 for forming the coupling to the second edge part P2*a* formed along the perimeter of the elongated slot S may be formed at both sides of the fourth sealing portion 54 for the coupling to the second edge part P2*a* formed at both sides of the elongated slot S. As such, the third sealing portion 53 may cross the fourth sealing portion 54 at the middle position (for example, a position corresponding to the upper surface of the second edge part P2*a*) in the extension direction (third direction Z3) of the fourth sealing portion 54, extending toward both sides of the fourth sealing portion 54, and the third and fourth sealing portions 53 and 54 may have an overall cross shape.

Referring to FIG. 5, the second coupling line L2 for coupling between the second edge part P2*a* and the main inner edge part may be formed along the elongated slot S, may not be discontinued at the bridge BR between the elongated slots S neighboring each other in the first direction Z1, and may be continuously formed along the whole of the elongated slot S and the bridge BR arranged in the first direction Z1. In this state, although the elongated slot S for injecting the sealing material is not formed at the bridge BR, the sealing material may be injected through the elongated slots S neighboring in the first direction Z1, and the second coupling line L2 may be continuously formed in the first direction Z1 along the whole of the elongated slot S and the bridge BR.

The sealing portion 50 (corresponding to an the outer sealing portion 50*a*) described with reference to FIG. 7 may form a coupling to the second edge part P2*a* formed along the edge of the second plate P2, and may be formed asymmetrically for the coupling to the second edge part P2*a* formed at the edge of the second plate P2. For example, the first sealing portion 51 may extend from the one side of the second sealing portion 52. Unlike the above, the sealing portion 50 (corresponding to an inner sealing portion 50*b*) described with reference to FIG. 8 may form a coupling to the second edge part P2*a* along the perimeter of the elongated slot S of the second plate P2, and may be formed symmetrically for the coupling to the two second edge parts P2*a* formed at both sides of the elongated slot S. For example, the third sealing portion 53 may extend from both sides of the fourth sealing portion 54.

For reference, the sealing portion 50 (the outer sealing portion 50*a*) formed along the edge of the second plate P2 may include the first sealing portion 51 extending between the main edge part M and the second edge part P2*a* and the second sealing portion 52 extending across the first sealing portion 51 in a direction crossing the first sealing portion 51 from the position bordering the outside of the main edge part M. Furthermore, the sealing portion 50 (the inner sealing portion 50*b*) formed along the perimeter of the elongated slot S of the second plate P2 may include the third sealing portion 53 extending between the main edge part M and the second edge part P2*a* and the fourth sealing portion 54 extending across the third sealing portion 53 in a direction crossing the third sealing portion 53 from the position bordering the elongated slot S of the second plate P2 corresponding to the outside of the main edge part M. In this state, the first and third sealing portions 51 and 53 may correspond to a first sealing portion of the claim in that the former extend between the main edge part M and the second edge part P2*a*. Furthermore, the second and fourth sealing portions 52 and 54 may correspond to a second sealing portion of the claim in that the former extends across the first and third sealing portions 51 and 53 (corresponding to the first sealing portion of the claim) in a direction crossing the first and third sealing portions 51 and 53 (corresponding to the first sealing portion of the claim) from the position bordering the outside of the main edge part M. However, as described above, according to the position of the sealing portion 50, the sealing portion 50 (the outer sealing portion 50*a*) (see FIG. 7) formed along the edge of the second plate P2 may include the first sealing portion 51 extending from the one side of the second sealing portion 52, thereby forming an asymmetrical cross-section, and the sealing portion 50 (the inner sealing portion 50*b*) (see FIG. 8) formed along the perimeter of the elongated slot S of the second plate P2 may include the third sealing portion 53 (corresponding to the first sealing portion of the claim)

extending to both sides of the fourth sealing portion 54 (corresponding to the second sealing portion of the claim), thereby forming a symmetrical cross-section.

Referring to FIGS. 7 and 8 together, the protruding step part 21 may be formed at the second edge part P2*a* of the second plate P2, and the protruding step part 21 may be formed at each of the second edge part P2*a* (the second edge part P2*a* adjacent to the main outer edge part MO) formed at the edge of the second plate P2 of the second edge part P2*a* and the second edge part P2*a* (the second edge part P2*a* adjacent to the main inner edge part MI) formed around the elongated slot S of the second plate P2. The protruding step part 21 may include an upper surface protruding upward and a concave lower surface recessed downward, and the concave lower surface of the protruding step part 21 may function as the jig groove 22. The protruding upper surface of the protruding step part 21 may function as a wall body to define the cooling path F therebetween, and the cooling path F may be formed between the protruding step part 21 formed at the edge of the second plate P2 and the protruding step part 21 formed around the elongated slot S of the second plate P2. The protruding step part 21 may function to protect the cooling path F, for example, the clogging of the cooling path F as the sealing portion 50 (the sealing material forming the sealing portion 50) formed around the cooling path F leaks into the cooling path F may be prevented or reduced.

The cooling path F may be formed between the first plate P1 individually formed for each accommodation space G and the second plate P2 arranged to face the first plate P1, and between the first exposure part P1*b* of the first plate P1 and the second exposure part P2*b* of the second plate P2. In this state, the first exposure part P1*b* may define the one side of the cooling path F in the third direction Z3, and the second exposure part P2*b* may define the other side of the cooling path F in the third direction Z3. In this state, the second exposure part P2*b* that defines the other side of the cooling path F may correspond to the protruding step part 21 (see FIG. 7) formed at the edge of the second plate P2 and the protruding step part 21 (see FIG. 8) formed around the elongated slot S of the second plate P2. The cooling path F may be individually formed for each accommodation space G, and the first plate P1 may be individually formed for each accommodation space G and may define the one side of the cooling path F.

Although the second plate P2 may not be individually formed for each accommodation space G, but may define one cooling path F from one edge of the second plate P2 to the elongated slot S (the protruding step part 21 around the elongated slot S), and may define another cooling path F from the elongated slot S (the protruding step part 21 around the elongated slot S) to the other edge of the second plate P2. In this state, the pair of protruding step parts 21 (the protruding step part 21 adjacent to main inner edge part MI) formed around the elongated slot S may form different cooling paths F, the pair of protruding step parts 21 formed around the elongated slot S may include upper surfaces connected to each other to be flat, and the elongated slot S formed between the pair of protruding step parts 21 may provide the injection position of the sealing material for the formation of the third and fourth sealing portions 53 and 54. According to some embodiments, the protruding step part 21 formed around the elongated slot S may be formed between the cooling path F and the sealing portion 50, and the clogging of the cooling path F as the sealing material forming the sealing portion 50 leaks into the cooling path F may be prevented or reduced. For example, resistance of the sealing material to a leakage path may be increased through the upper surface of the protruding step part 21, and accordingly leakage of the sealing material into the cooling path F may be prevented or reduced.

According to some embodiments, the cooling path F may extend in the first direction Z1 corresponding to the lengthwise direction of the battery module 1, and the cooling path F extending in the first direction Z1 may extend across the accommodation space G arranged in the first direction Z1 to cool the battery assembly B accommodated in the accommodation space G.

The module housing 5 according to some embodiments may be formed by the DSI method. For example, in the DSI method, the main housing H and the first plate P1 formed of heterogeneous materials may be integrally formed by insert molding through the primary molding. In this state, in the primary molding, the molding of the second plate P2 may be simultaneously (or concurrently) performed with the insert molding of the main housing H and the first plate P1. For example, in the primary molding, the molding jig for the insert molding and the molding jig for forming the second plate P2 may perform the respective molding processes at positions apart from each other, and in the secondary molding following the primary molding, while at least one of the molding jig for the insert molding or the molding jig for forming the second plate P2 slides toward the other, the primary molding body incorporating the main housing H and the first plate P1 and the second plate P2 slide to positions in contact with each other, and then the sealing material is injected through the injection position, thereby forming the sealing portion 50 mediating the coupling between the primary molding body and the second plate P2.

According to some embodiments, to increase the coupling force in the secondary molding, the main housing H, the second plate P2, and the sealing portion 50 may include a homogeneous resin material, the first plate P1 may include a metal material having excellent heat conduction properties, for example, an aluminum material, considering the cooling performance of the accommodation space G. As such, the module housing 5 according to some embodiments may include a composite material including a metal material and a resin material.

The structure of the first coupling line L1 forming a coupling between the first plate P1 and the main housing H is described below with reference to FIG. 4. The first coupling line L1 may be formed along the first edge part P1*a* formed at the edge of the first plate P1 individually formed to each accommodation space G, and accordingly, the first coupling line L1 may form each closed loop surrounding each accommodation space G. In other words, the first coupling line L1 may have a closed loop shape formed along the edge of the first plate P1 individually formed for each accommodation space G. For example, four closed loop shapes individually surrounding each of the first to fourth accommodation spaces G1, G2, G3, and G4 may be formed. For example, according to some embodiments, the first coupling line L1 in a closed loop shape may have an angled corner. As described below, the second coupling line L2 may be formed in a closed loop shape along the edge of the second plate P2, and the second coupling line L2 may have a rounded corner considering the fluidity of the sealing material for forming the sealing portion 50. As the second coupling line L2 includes the sealing portion 50 formed through the injection of the sealing material, the second coupling line L2 may have a rounded corner considering the fluidity of the sealing material. As the first coupling line L1 includes the recessed holding portion RH formed by the insert molding, the first coupling line L1 may have an angled corner unlike the second coupling line L2.

The first coupling line L1, which individually surrounds each accommodation space G, may be formed in a pair along the elongated slot S of the second plate P2 formed between the accommodation spaces G neighboring each other, that is, the first and second accommodation spaces G1 and G2 and the third and fourth accommodation spaces G3 and G4 neighboring in the second direction Z2. For example, along the elongated slot S of the second plate P2, the first coupling line L1 may include a pair of first coupling lines L1 individually surrounding the first and second accommodation spaces G1 and G2, and furthermore, a pair of first coupling lines L1 individually surrounding the third and fourth accommodation spaces G3 and G4.

The structure of the second coupling line L2 forming a coupling between the second plate P2 and the main housing H is described below with reference to FIG. 5. The second coupling line L2 may include the second coupling line L2 formed at the second edge part P2a formed at in a closed loop shape along the edge of the second plate P2 commonly formed to the whole of the accommodation space G the second coupling line L2. In this state, as the second coupling line L2 includes the sealing portion 50 formed by the injection of the sealing material, the second coupling line L2 formed in a closed loop shape considering the fluidity of the sealing material may include a rounded corner. For example, the second coupling line L2 formed in a closed loop shape may form the second coupling line L2 in a closed loop shape as the sealing material flows along the second coupling line L2 with at least one place along the second coupling line L2 as the injection position of the sealing material, and thus the second coupling line L2 may include a rounded corner considering the fluidity of the sealing material.

The second coupling line L2 may include the second coupling line L2 formed in a stripe shape along the second edge part P2a formed around the elongated slot S formed inside the second plate P2. In this state, the second coupling line L2, with the position of the elongated slot S as the injection position of the sealing material, may not be discontinued at the bridge BR between the elongated slots S and may continuously extend in the first direction Z1 across the bridge BR. The second coupling line L2 may be formed through the injection of the sealing material, with at least any one place as the injection position of the sealing material along the second coupling line L2 in a stripe shape, and as the sealing material flows in the second direction Z2, the second coupling line L2 extending in a stripe shape may be formed.

Figure 9:
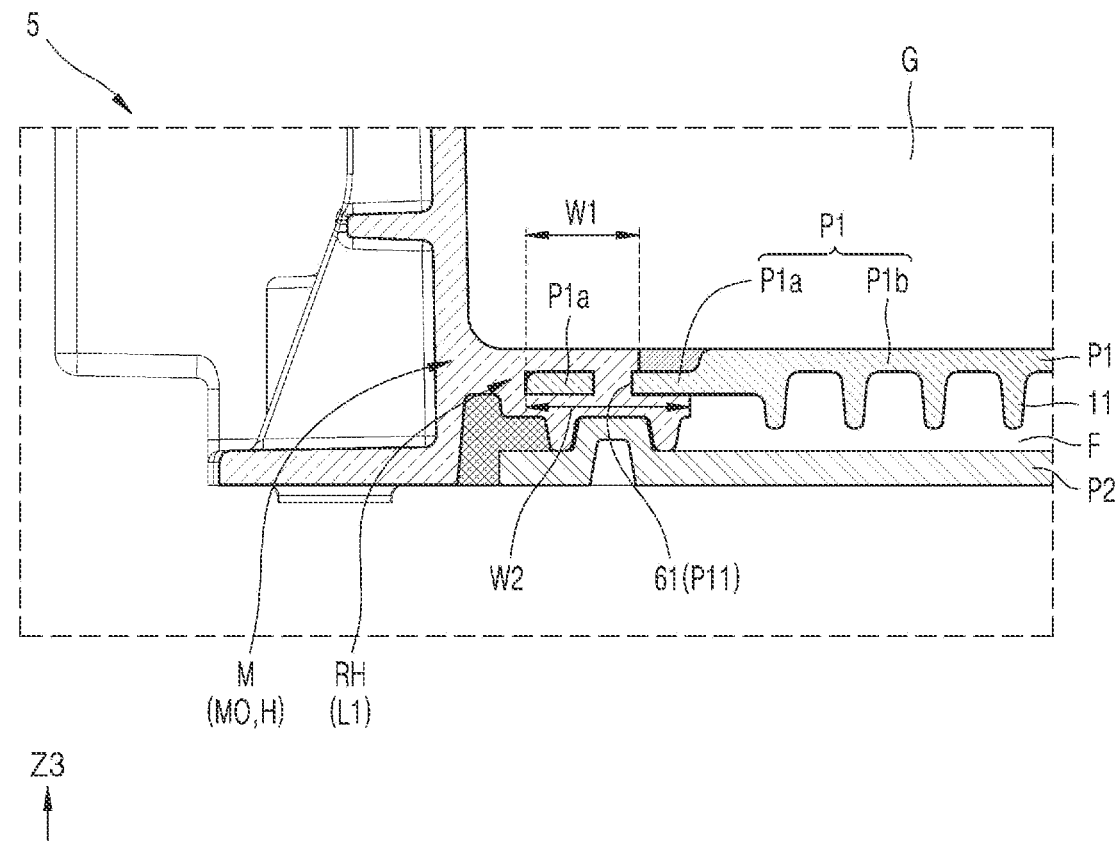
FIG. 9 is a cross-sectional view showing a matching structure of a module housing according to some embodiments.
Figure 10:
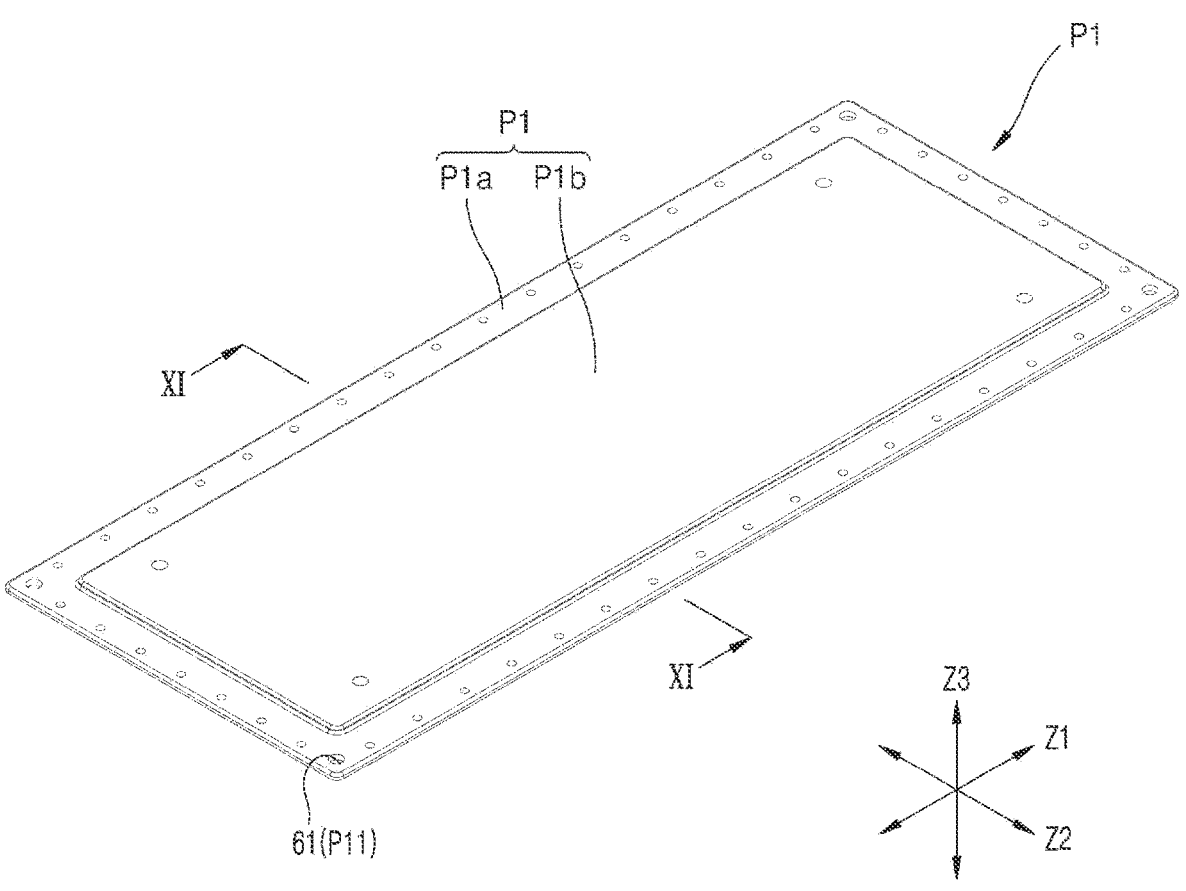
FIG. 10 is a perspective view of a first plate of FIG. 9.
Figure 11:
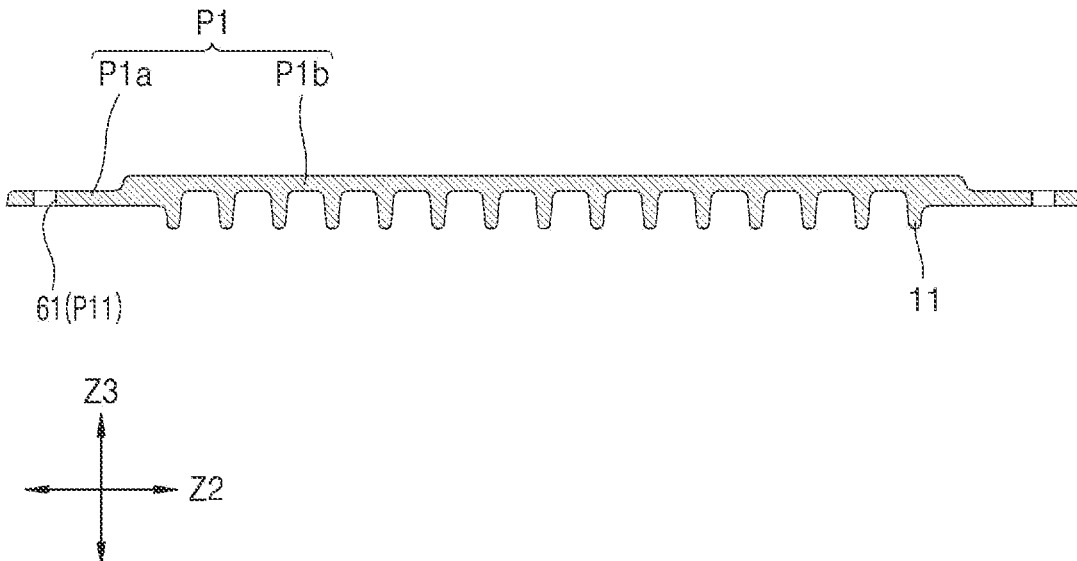
FIG. 11 is a cross-sectional view of a first plate taken along the line XI-XI of FIG. 10.
Figure 12:
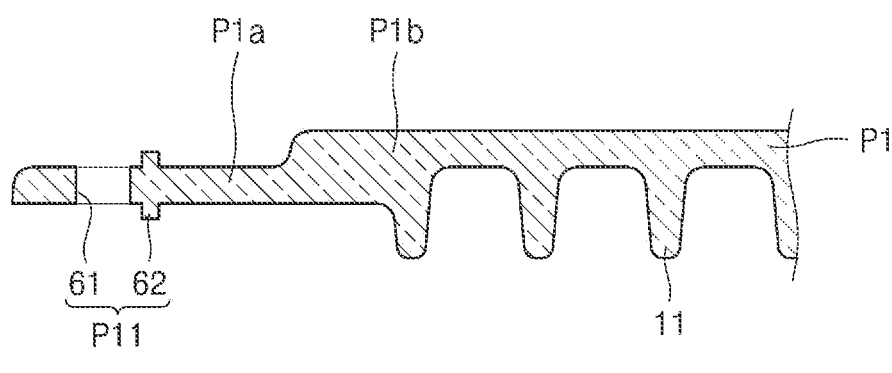
FIG. 12 is a cross-sectional view of the first plate of FIG. 9 according to some embodiments.
Figure 12:
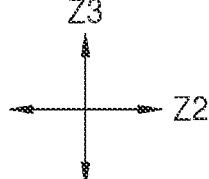
Figure 13:
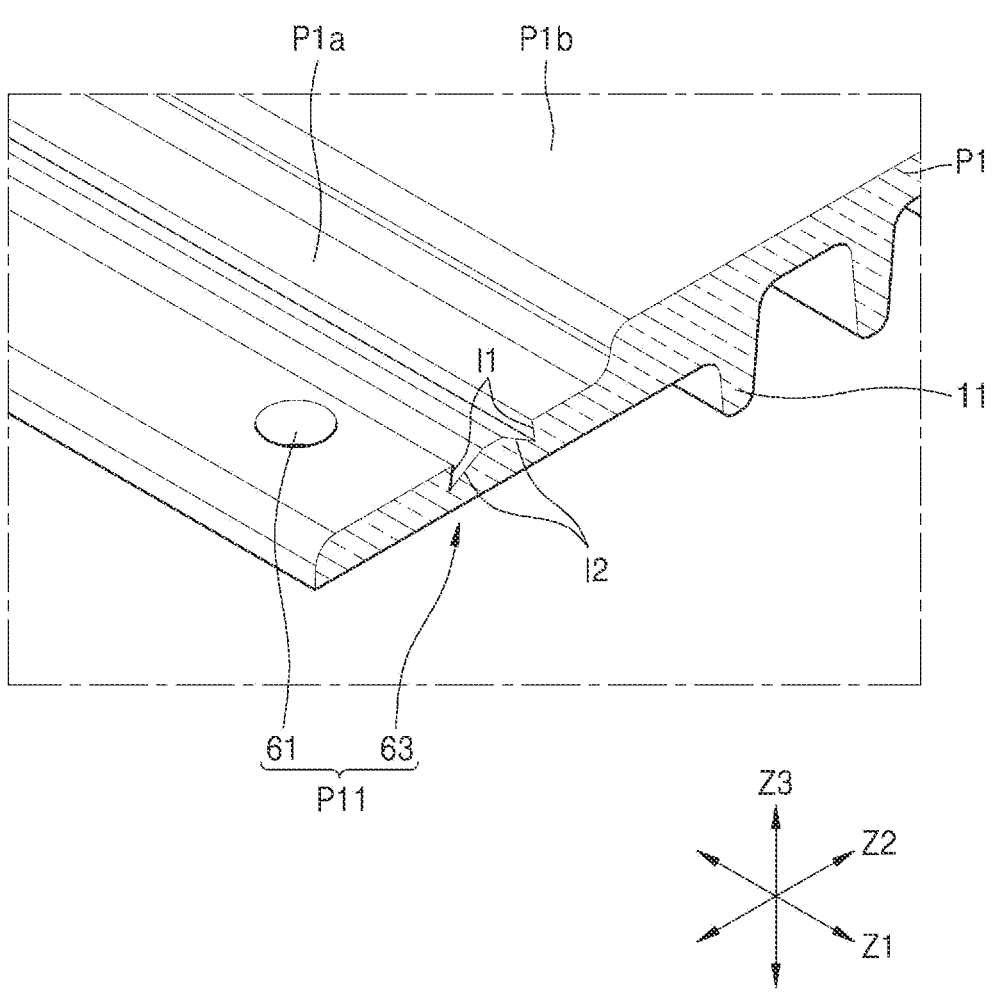
FIG. 13 is a perspective view of the first plate of FIG. 9 according to some embodiments.

FIG. 9 is a cross-sectional view showing a matching structure of the module housing 5 according to some embodiments. FIG. 10 is a perspective view of the first plate P1 of FIG. 9. FIG. 11 is a cross-sectional view of the first plate P1 of FIG. 10 taken along line XI-XI. FIG. 12 is a cross-sectional view of the first plate P1 of FIG. 9 According to some embodiments. FIG. 13 is a perspective view of the first plate P1 of FIG. 9 according to some embodiments.

Referring to the drawings, the module housing 5 according to some embodiments may include a matching structure P11 between the first edge part P1a and the main edge part M, as a structure to reinforce the coupling force between the first plate P1 and the main housing H formed through insert molding. The matching structure P11 between the first edge part P1a and the main edge part M may mean a structure having a shape matching to be inserted with respect to each other through a complementary shape so that the first edge part P1a and the main edge part M integrally formed through insert molding are not separated from each other. According to some embodiments, a hole 61, a protruding portion 62, and an uneven pattern 63 may be formed along the first edge part P1a formed at the edge of the first plate P1, and the hole 61, the protruding portion 62, and the uneven pattern 63 formed along the first edge part P1a may be filled or embedded by part of the main housing H formed in a shape complementary thereto, and may form an interface with the main housing H.

The hole 61, the protruding portion 62, and the uneven pattern 63 formed in the first edge part P1a, which are filled or embedded by part of the main housing H having a shape complementary thereto or forms an interface, may form a firm coupling between the first edge part P1a and the main housing H. The part of the main housing H forming a physical interference with the hole 61, the protruding portion 62, and the uneven pattern 63 formed in the first edge part P1a may mean at least one of the upper width W1 covering the upper surface of the first edge part P1a or the lower width W2 covering the lower surface of the first edge part P1a, among the recessed holding portion RH forming a coupling to the first edge part P1a, and at least one of the upper width W1 or the lower width W2 may form a firm coupling to the first plate P1 by filling or embedding the hole 61, the protruding portion 62, and the uneven pattern 63 formed in the first edge part P1a or forming an interface.

For example, as illustrated in FIG. 12, the protruding portion 62 protruding from the first edge part P1a in vertically opposite directions may form the matching structure P11 with the upper width W1 and the lower width W2 of the recessed holding portion RH. For example, a groove shape that is complementary to the protruding portion 62 to embed the same may be formed on each of the upper width W1 and the lower width W2. Furthermore, as illustrated in FIG. 13, the uneven pattern 63 formed upward at the first edge part P1a may form the matching structure P11 with the upper width W1 of the recessed holding portion RH. For example, a wedge shape that is complementary to the uneven pattern 63 may be formed in the upper width W1 to form an inclined interface with the uneven pattern 63. As illustrated in FIG. 9, the hole 61 formed in the first edge part P1a may be filled with a protruding shape extending from the upper width W1 and the lower width W2 of the recessed holding portion RH, and the protruding shape extending from the upper width W1 and the lower width W2 of the recessed holding portion RH may form the matching structure P11 while filling the hole of the first edge part P1a.

In the following description, the matching structure P11 between the first plate P1 and the main housing H is described in more detail.

Referring to FIGS. 9 to 11, the hole 61 to be filled with part of the main edge part M may be formed in the first edge part P1a formed along the edge of the first plate P1. According to some embodiments, the hole 61 formed in the first edge part P1a may be formed along the edge of the first plate P1, and may be formed overall along the first coupling line L1 that forms the coupling to the first edge part P1a formed at the edge of the first plate P1. As the hole 61 of the first edge part P1a is filled with part of the main edge part M that is formed in a shape complementary thereto, the coupling strength between the first edge part P1a and the main edge part M may be improved. According to some embodiments, the first plate P1 may be formed with the main housing H through insert molding. In this state, in the insert molding, as the hole 61 formed in the first edge part P1a of the first plate P1 is filled with a molten resin forming the main housing H, the main edge part M for filling the hole 61 of the first edge part P1*a* may be formed. In this state, the main edge part M, which is formed in a complementary shape filling the hole 61 of the first edge part P1*a*, may form a firm coupling by having a shape matching between the main edge part M and the hole 61 of the first edge part P1*a*.

When the first plate P1, which forms the cooling path F with the second plate P2, is lifted by a high pressure of the cooling medium flowing in the cooling path F, the cooling medium leaks. Thus, the position of the first plate P1 needs to be firmly fixed and the coupling force between the first plate P1 and the main housing H needs to be increased. Thus, according to some embodiments, as a plurality of holes 61 are formed along the edge of the first plate P1 to have a shape matching through insert molding, the coupling strength between the first plate P1 and the main housing H may be increased, and the leakage of the cooling path F due to the first plate P1 may be prevented or reduced. A plurality of heat radiation fins 11 protruding toward the cooling path F may be formed at the first exposure part P1*b* of the first plate P1 defining the one side of the cooling path F. According to some embodiments, the heat radiation fins 11 may extend in the first direction Z1 in which the cooling path F extends. The first direction Z1 in which the cooling path F extends may correspond to the lengthwise direction of the accommodation space G.

Referring to FIG. 12, the protruding portion 62 may be formed around the hole 61 formed at the edge of the first plate P1. The protruding portion 62 may be formed along the first edge part P1*a* formed at the edge of the first plate P1, and according to some embodiments, the protruding portion 62 may be formed overall along the first coupling line L1 formed along the edge of the first plate P1. The protruding portion 62, similar to the hole formed along the edge of the first plate P1, may reinforce the coupling force formed through insert molding between the first edge part P1*a* and the main edge part M.

For example, the protruding portion 62 formed to protrude in the thickness direction (third direction Z3) at the edge of the first plate P1 may have a shape matching with the main edge part M that embeds the protruding portion 62 in a complementary shape, and a groove in a complementary shape is formed in the main edge part M to accommodate the protruding portion 62 of the first edge part P1*a*, forming a shape matching with each other. According to some embodiments, the embedding of the protruding portion 62 by the main edge part M in a complementary shape may mean that the main edge part M is formed in a complementary shape to the protruding portion 62 and surrounds the protruding portion 62 overall not to expose the protruding portion 62.

According to some embodiments, the protruding portion 62 may protrude in vertically opposite directions in the thickness direction (third direction Z3) of the first plate P1, and a groove for accommodating the protruding portion 62 may be formed in the main edge part M at both upper and lower positions of the first plate P1. According to some embodiments, the protruding portion 62 may be formed around the hole 61 formed along the edge of the first plate P1. For example, the protruding portion 62 may be formed at a position inner than the hole 61 formed at the edge of the first plate P1. However, in various embodiments, the protruding portion 62 may be formed along the edge of the first plate P1 where the hole 61 is not formed, and regardless of the existence of the hole 61, the protruding portion 62 may form a shape matching between the first edge part P1*a* and the main edge part M, thereby improving the coupling strength therebetween.

Referring to FIG. 13, the uneven pattern 63 for forming an inclined interface with the main edge part M may be formed on the edge of the first plate P1. For example, the uneven pattern 63 may be formed along the edge of the first plate P1, and for example, the uneven pattern 63 may be formed overall along the first coupling line L1 formed at the edge of the first plate P1. According to some embodiments, the uneven pattern 63 may form an interface with the main edge part M formed in a complementary shape, and may form at least one inclined interface. For example, the uneven pattern 63 may form an inclined interface in the second direction Z2. According to some embodiments, the uneven pattern 63 may form a first pair I1 of interfaces inclined to face each other.

According to some embodiments, the uneven pattern 63 may form an inclined interface in a dovetail shape with the main edge part M. For example, the uneven pattern 63 may form the first pair I1 of interfaces inclined to face each other by forming an interface inclined by 45° to the second direction Z2 and an interface inclined by −45° to the second direction Z2. The first pair I1 of interfaces formed by the uneven pattern 63 being inclined to face each other may mean that the first pair I1 of interfaces gradually approach each other from a lower position to an upper position in the thickness direction (third direction Z3) of the first plate P1. In other words, the first pair I1 of interfaces formed by the uneven pattern 63 may approach each other from the lower position to the upper position in a direction opposite to the second plate P2. As such, because the interface may have inclinations that approach each other from the lower position to the upper position, part of the main housing H formed between the first pair I1 of interfaces may be effectively prevented from being detached from the first pair I1 of interfaces.

The uneven pattern 63 is configured to reinforce the coupling strength between the first plate P1 and the main housing H integrated through insert molding, and may form a shape matching as the main housing H fills the uneven pattern 63 of the first plate P1 in a complementary shape. According to some embodiments, the uneven pattern 63 may be formed at the edge of the first plate P1 with the hole 61. For example, according to some embodiments, the hole 61 and the uneven pattern 63 filled with the main edge part M may be formed together at the edge of the first plate P1 (the first edge part P1*a*). In this state, the uneven pattern 63 may be formed at a positon inner than the hole 61 formed at the edge of the first plate P1. However, in various embodiments, the uneven pattern 63 may be formed along the edge of the first plate P1 in which the hole 61 is not formed, and regardless of the existence of the hole 61, the uneven pattern may improve the coupling strength therebetween by forming a shape matching between the first edge part P1*a* and the main edge part M.

According to some embodiments, the uneven pattern 63 may further include, in addition to the first pair I1 of interfaces inclined to face each other, a second pair I2 of interfaces inclined to face each other between the first pair I1 of interfaces facing each other. In this state, each of the first pair I1 of interfaces and the second pair I2 of interfaces being inclined to face each other may mean that each of the first pair I1 of interfaces and the second pair I2 of interfaces has inclinations gradually approaching each other from the lower position to the upper position in the thickness direction (third direction Z3) of the first plate P1. In this state, the first pair I1 of interfaces may include an interface inclined by 45° to the second direction Z2 and an interface inclined by −45° to the second direction Z2, and the second pair I2 of interfaces may include interfaces inclined further downward toward the second plate P2 than the first pair I1 of interfaces. For example, the second pair I2 of interfaces may include interfaces inclined by an inclination greater than 45° and −45°. According to some embodiments, while each of the first pair I1 of interfaces and the second pair I2 of interfaces has inclinations that approach each other from the lower position to the upper position in a direction opposite to the second plate P2, the second pair I2 of interfaces may have inclinations further inclined toward the second plate P2 than the first pair I1 of interfaces.

Regarding the uneven pattern 63 including the first pair I1 of interfaces and the second pair I2 of interfaces, the main housing H in a complementary shape to the uneven pattern 63, for example, a complementary shape including, in the second direction Z2, a wedge shape formed between one interface of the first pair I1 of interfaces and one interface of the second pair I2 of interfaces and a wedge shape formed between the other side interface of the first pair I1 of interfaces and the other interface of the second pair I2 of interfaces, has a shape matching with the uneven pattern 63, thereby improving the coupling strength with the first plate P1 including the uneven pattern 63 by insert molding.

Figure 14:
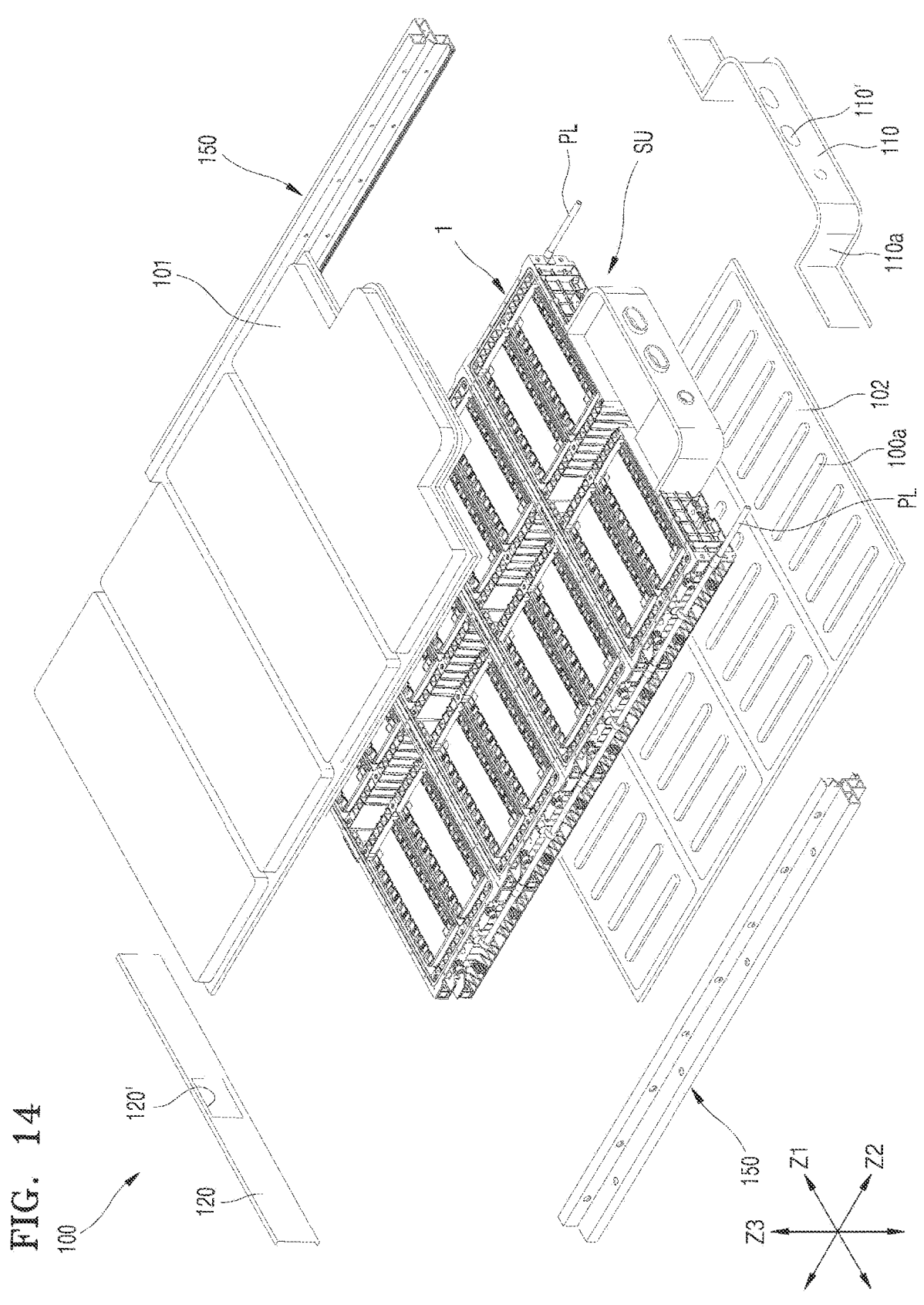
FIG. 14 is an exploded perspective view of a power supply including the battery module of FIG. 1, according to some embodiments.

FIG. 14 is an exploded perspective view of a power supply including the battery module of FIG. 1, according to some embodiments.

Referring to the drawing, the power supply 100 may include a power supply unit SU and first and second metal plates 101 and 102 arranged at least one side of the power supply unit SU. The power supply unit SU may include one or a plurality of battery modules as the battery module 1 of FIG. 1. According to some embodiments, the power supply unit SU may include a plurality of battery modules 1 arranged in the second direction Z2. According to some embodiments, the first and second metal plates 101 and 102 may be arranged on an upper surface and a lower surface of the power supply unit SU, respectively. The upper surface and the lower surface the power supply unit SU may mean a surface forming an upper portion of the power supply unit SU and a surface forming a lower portion of the power supply unit SU, in the third direction Z3.

The first and second metal plates 101 and 102 may block electromagnetic wave noise radiated from the power supply unit SU and electromagnetic wave noise approaching the power supply unit SU, thereby preventing or reducing instances of a malfunction of the power supply 100 and a malfunction of a device on which the power supply 100 is mounted. According to some embodiments, the first and second metal plates 101 and 102 may include a steel material.

A plurality of beads 100a for absorbing shocks may be formed on the first and second metal plates 101 and 102. For example, according to some embodiments, the beads 100a may be formed on at least any one of the first and second metal plates 101 and 102, for example, the second metal plate 102 arranged at a relatively lower position in the third direction Z3 and supporting the power supply unit SU. In this state, each of the beads 100a may be individually formed for each battery module 1 provided in the power supply unit SU, and in the form of a disconnected shape for each battery module 1. The beads 100a formed on first and second metal plates 101 and 102 may absorb external shocks applied in the third direction Z3 and shocks applied to the inside of the battery module 1. For example, the power supply 100 according to some embodiments may be mounted in a vehicle as a driving power for the vehicle, and may protect the battery module 1 from shocks applied during running of the vehicle. In this state, the beads 100a formed on the first and second metal plates 101 and 102, which are formed in the form of a disconnected shape for each battery module 1, may prevent or reduce shocks of one neighboring battery module 1 to another neighboring battery module 1 via the beads 100a. For example, the beads 100a may be formed in a stripe form extending in the second direction Z2, and in the form of a disconnected shape for each battery module 1 in the second direction Z2. The beads 100a, which protects the battery module 1, may be formed on the inner surfaces of the first and second metal plates 101 and 102 toward the battery module 1.

According to some embodiments, the power supply 100 may include front, rear, and side surface reinforcement frames 110, 120, and 150 arranged in the respective side parts connecting the upper surface and the lower surface of the power supply unit SU. For example, the front surface reinforcement frame 110, the rear surface reinforcement frame 120, and the side surface reinforcement frame 150 may be arranged on a front surface, a rear surface, and a side surface of the power supply unit SU, respectively. The front, rear, and side surface reinforcement frames 110, 120, and 150 may include a metal material, and may provide noise blocking with the first and second metal plates 101 and 102. For example, the front, rear, and side surface reinforcement frames 110, 120, and 150 may include the same steel material as the first and second metal plates 101 and 102. The front surface and the rear surface of the power supply unit SU may mean a surface forming the front side of the power supply unit SU and a surface forming the rear side of the power supply unit SU, in the second direction Z2. The side surface of the power supply unit SU may mean a side surface extending in the second direction Z2 and connecting the front surface and the rear surface of the power supply unit SU.

According to some embodiments, the front surface and the rear surface of the power supply unit SU may correspond to a short side of the power supply unit SU or a long side of the battery module 1, and the side surface of the power supply unit SU may correspond to a long side of the power supply unit SU or a short side of the battery module 1. For example, according to some embodiments, the power supply unit SU may include a plurality of battery modules 1 arranged in the second direction Z2 so that the long sides of the battery modules 1 extending in the first direction Z1 face each other. Accordingly, the power supply unit SU may include a short side corresponding to the long side of the battery module 1 extending in the first direction Z1 and a long side extending in the second direction Z2 in which the battery modules 1 are arranged. In other words, the long side of the power supply unit SU may correspond to the short side of each battery module 1, and the short side of the power supply unit SU may correspond to the long side of each battery module 1.

Through the present specification, the front surface and the rear surface of the power supply unit SU or the front surface and the rear surface of the battery module 1 may respectively mean short sides forming both end portions along the lengthwise direction of the power supply unit SU or the lengthwise direction of the battery module 1. The side surface of the power supply unit SU or the side surface of the battery module 1 may respectively mean a long side extending along the lengthwise direction of the power supply unit SU or the lengthwise direction of the battery module 1. Accordingly, the front surface reinforcement frame 110 and the rear surface reinforcement frame 120 arranged at the front surface and the rear surface of the power supply unit SU corresponding to the short side of the power supply unit SU may be arranged at the side surface corresponding to the long side of the battery module 1. Furthermore, the side surface reinforcement frame 150 arranged at the side surface of the power supply unit SU corresponding to the long side of the power supply unit SU may be arranged at the front surface and the rear surface corresponding to the short side of the battery module 1.

The front surface reinforcement frame 110 may include an accommodation portion protruding forward to accommodate a battery management system (BMS) arranged at the front surface of the power supply unit SU. Accordingly, a bent portion 110a for forming the accommodation portion may be formed at the front surface reinforcement frame 110. Furthermore, a connection hole 110' for electrical connection to the BMS may be formed in the front surface reinforcement frame 110.

A vent hole 120' may be formed in the rear surface reinforcement frame 120. For example, the power supply 100 according to some embodiments may be mounted, as a driving power of a vehicle, in the vehicle, and the front surface and the rear surface of the power supply 100 may be arranged toward a front surface and a rear surface of the vehicle. Accordingly, a discharge gas discharged through the vent hole 120' of the rear surface reinforcement frame 120 may be discharged to the outside through an exhaust pipe at the rear of the vehicle.

The front, rear, and side surface reinforcement frames 110, 120, and 150 may block electromagnetic wave noise with the first and second metal plates 101 and 102, and may also protect the power supply unit SU. For example, in the power supply 100 mounted in the vehicle, although some amount of external shocks applied to the front surface and the rear surface of the power supply 100 is expected to be absorbed through bumpers placed on the front and rear surfaces of the vehicle, it is difficult to expect external shocks applied toward the side surface of the power supply 100 to be absorbed by the vehicle, so that it may be desirable to employ a shock absorption structure of the power supply 100 itself. Accordingly, in the power supply 100 according to some embodiments, the side surface reinforcement frame 150 having a structure further reinforced than the front surface reinforcement frame 110 and the rear surface reinforcement frame 120 may be employed. For reference, the front surface, the rear surface, and the side surface of the power supply 100 according to some embodiments may be arranged in the vehicle to respectively face the front surface, the rear surface, and the side surface of the vehicle. Accordingly, bumpers placed at the front surface and the rear surface of the vehicle may reduce external shocks applied to the front surface and the rear surface of the power supply 100.

According to some embodiments, the front surface reinforcement frame 110 and the rear surface reinforcement frame 120 may be provided in the form of a metal strip, and the side surface reinforcement frame 150 may have a closed cross-section, not in the form of an at least metal strip, to provide excellent shock absorption, compared with the front surface reinforcement frame 110 and the rear surface reinforcement frame 120.

For example, the side surface reinforcement frame 150 may be arranged on the side surface of the power supply unit SU. For example, the side surface reinforcement frame 150 may be arranged in a pair at both side surfaces of the power supply unit SU facing each other in the first direction Z1. The side surface of the power supply unit SU on which the side surface reinforcement frame 150 is arranged may correspond to the long side of the power supply unit SU, and to the front surface and the rear surface corresponding to the short side of the battery module 1. In other words, the side surface reinforcement frame 150 may extend across a plurality of front surfaces and rear surfaces of the battery modules 1 respectively extending in the first direction Z1 and arranged in the second direction Z2.

The side surface reinforcement frame 150 according to some embodiments may surround the coolant pipe PL arranged on the side surface of the power supply unit SU. According to some embodiments, the side surface reinforcement frame 150 may partially surround the coolant pipe PL, and may surround part of the coolant pipe PL arranged at the opposite side with respect to the power supply unit SU. For example, the coolant pipe PL may be connected to the cooling path F provided in each battery module 1, may extend across a plurality of cooling paths F provided in each battery module 1, and may supply the cooling medium to the cooling paths F or collect the cooling medium from the cooling paths F. According to some embodiments, the coolant pipe PL may supply or collect the cooling medium with respect to the cooling paths F extending in the first direction Z1 corresponding to the lengthwise direction of each battery module 1, by extending in the second direction Z2 in which the battery modules 1 are arranged and being branched in the first direction Z1 at a position corresponding to each battery module 1 or the cooling path F provided in each battery module 1.

According to some embodiments, a battery module having a module housing may provide relatively high cooling performance and may have a relatively light weight due to the use of a composite material including different heterogeneous materials, and may have a relatively improved coupling strength between the heterogeneous materials to prevent or reduce leakage of a cooling path.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims, and their equivalents.

What is claimed is:

1. A battery module comprising:
a battery assembly;
a main housing comprising a main edge part surrounding an accommodation space in which the battery assembly is located;
a first plate comprising a first edge part coupled to the main edge part and a first exposure part exposed from the main edge part and defining one side of a cooling path for cooling the accommodation space;
a second plate facing the first plate and defining an other side of the cooling path:
a matching structure between the main edge part of the main housing and the first edge part of the first plate,
wherein the matching structure comprises a first pair of interfaces of the first edge part, the first pair of interfaces extending from an upper surface of the first edge part toward the second plate and being inclined toward each other in a direction away from the second plate,
wherein the first plate is inserted into a recessed holding portion of the main edge part, and

wherein the first plate further comprises a plurality of fins spaced apart from the recessed holding portion and protruding towards the second plate into the cooling path.

2. The battery module of claim 1, wherein the matching structure comprises a plurality of holes formed along the first edge part and filled with part of the main edge part and formed in a complementary shape to the plurality of holes.

3. The battery module of claim 1, wherein the main edge part has a complementary shape to the first pair of interfaces.

4. The battery module of claim 3, wherein the matching structure further comprises a second pair of interfaces of the first edge part, the second pair of interfaces being inclined to face each other between the first pair of interfaces.

5. The battery module of claim 4, wherein the second pair of interfaces has inclinations that approach each other from a lower position to an upper position in the direction away from the second plate.

6. The battery module of claim 4, wherein the second pair of interfaces have inclinations that are further inclined toward each other than the first pair of interfaces.

7. The battery module of claim 1, wherein
the matching structure comprises both of a plurality of holes formed along the first edge part and an uneven pattern, and
the uneven pattern is formed at an inner position of the first edge part than the plurality of holes formed at an edge of the first edge part.

8. The battery module of claim 1, wherein the main edge part and the first edge part are coupled to each other by a first coupling line formed along the first edge part.

9. The battery module of claim 8, wherein the first coupling line comprises the recessed holding portion, and wherein the recessed holding portion is concave to surround the first edge part.

10. The battery module of claim 9, wherein the recessed holding portion continuously surrounds the upper surface, a lower surface, and a side surface connecting the upper surface and the lower surface of the first edge part.

11. The battery module of claim 10, wherein
an upper surface of the first plate comprises the upper surface of the first edge part and an upper surface of the first exposure part facing the accommodation space, and
a lower surface of the first plate comprises the lower surface of the first edge part and a lower surface of the first exposure part facing the cooling path.

12. The battery module of claim 9, wherein
the recessed holding portion comprises an upper width covering an upper surface of the first edge part and a lower width covering a lower surface of the first edge part, and
at least any one of the upper width or the lower width forms a matching structure with the first plate.

13. The battery module of claim 12, wherein the lower width is greater than the upper width.

14. The battery module of claim 13, wherein a filling width is formed on the first edge part from the first edge part out of the upper width to a boundary with the first exposure part.

15. The battery module of claim 14, wherein a filler for reinforcing a coupling between the first edge part and the main edge part is formed in the filling width.

16. The battery module of claim 1, wherein
the accommodation space comprises a plurality of accommodation spaces for accommodating battery assemblies different from each other, and
the main edge part surrounds each of the plurality of accommodation spaces.

* * * * *